(12) United States Patent
Banerjee et al.

(10) Patent No.: US 11,416,638 B2
(45) Date of Patent: Aug. 16, 2022

(54) CONFIGURABLE LATTICE CRYPTOGRAPHY PROCESSOR FOR THE QUANTUM-SECURE INTERNET OF THINGS AND RELATED TECHNIQUES

(71) Applicant: Massachusetts Institute of Technology, Cambridge, MA (US)

(72) Inventors: Utsav Banerjee, Cambridge, MA (US); Anantha P. Chandrakasan, Belmont, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 137 days.

(21) Appl. No.: 16/794,746

(22) Filed: Feb. 19, 2020

(65) Prior Publication Data

US 2020/0265167 A1 Aug. 20, 2020

Related U.S. Application Data

(60) Provisional application No. 62/807,470, filed on Feb. 19, 2019.

(51) Int. Cl.
*G06F 21/72* (2013.01)
*H04L 9/30* (2006.01)
*G06F 7/58* (2006.01)

(52) U.S. Cl.
CPC ............. *G06F 21/72* (2013.01); *G06F 7/582* (2013.01); *H04L 9/3093* (2013.01); *H04L 2209/04* (2013.01)

(58) Field of Classification Search
None
See application file for complete search history.

(56) References Cited

U.S. PATENT DOCUMENTS 5,594,734 A * 1/1997 Worsley ................. H04L 12/44
370/395.53
7,814,329 B1 * 10/2010 Hutchison ............. H04L 9/0631
713/181
(Continued)

FOREIGN PATENT DOCUMENTS

CN       106685663 A * 5/2017 ........... H04L 9/0861
WO    WO 01/93497 A1    12/2001

OTHER PUBLICATIONS

Nejatollahi, et al.; "Post-quantum Lattice-based Cryptography Implementations: A Survey"; ACM Computing Surveys; vol. 1; No. 1; Article 1; Jan. 2018; 38 Pages.
(Continued)

*Primary Examiner* — Michael Pyzocha
(74) *Attorney, Agent, or Firm* — Daly, Crowley, Mofford & Durkee LLP

(57) ABSTRACT

Described is a lattice cryptography processor with configurable parameters. The lattice cryptography processor includes a sampling circuit configured to operate in accordance with a Secure Hash Algorithm 3 (SHA-3)-based pseudo-random number generator (PRNG), a single-port random access memory (RAM)-based number theoretic transform (NTT) memory architecture and a modular arithmetic unit. The described lattice cryptography processor is configured to be programmed with custom instructions for polynomial arithmetic and sampling. The configurable lattice cryptography processor may operate with lattice-based CCA-secure key encapsulation and a variety of different lattice-based protocols including, but not limited to: Frodo, NewHope, qTESLA, CRYSTALS-Kyber and CRYSTALS-Dilithium, achieving up to an order of magnitude improvement in performance and energy-efficiency compared to state-of-the-art hardware implementations.

19 Claims, 12 Drawing Sheets

(56) References Cited

U.S. PATENT DOCUMENTS

| | | | |
|---|---|---|---|
| 8,271,569 | B2 | 9/2012 | Mundarath et al. |
| 9,673,977 | B1 | 6/2017 | Kalach |
| 10,298,385 | B2* | 5/2019 | Khedr ............... H04L 9/008 |
| 2016/0239074 | A1 | 8/2016 | Lee et al. |
| 2016/0374116 | A1 | 12/2016 | Sexton et al. |
| 2018/0357933 | A1 | 12/2018 | Takashima |
| 2019/0312728 | A1* | 10/2019 | Poeppelmann ....... H04L 9/0662 |
| 2020/0082738 | A1* | 3/2020 | Poeppelmann ....... H04L 9/3093 |
| 2020/0259649 | A1* | 8/2020 | Garcia Morchon .. H04L 9/3093 |
| 2020/0371751 | A1* | 11/2020 | Tanaka ................ G06F 7/58 |
| 2020/0382299 | A1* | 12/2020 | Tanaka ............... H04L 9/3247 |

OTHER PUBLICATIONS

Search Report of the ISA dated Jun. 12, 2020 for International Application No. PCT/US2020/018766; 6 Pages.

Written Opinion of the ISA dated Jun. 12, 2020 for International Application No. PCT/US2020/018766; 9 Pages.

"Arm Cortex-M Series Processors", https://developer.arm.com/ip-products/processors/cortex-m; Copyright 1995-2021; 8 Pages.

"Arm MBED", SSL Library mbed TLS/PolarSSL, https://tls.mbed.org, Copyright 2008-2016; 1 Page.

"Secure Hash Standard (SHS)", National institute of Standards and Technology, Federal Information Processing Standards Publication, http:/www.nist.gov/manuscript-publication-search.cfm?pub_id=910977, March 2012, Publication No. FIPS 180-4, 39 Pages.

"SD Specifications Part 1 Physical Layer Simplified Specification Version 6.0", Technical Committee, SD Card Association, www.academy.cba.mit.edu/classes/networking-communications/SD/Sd.pdf, Apr. 10, 2017, 263 Pages.

Banerjee et al., "An Energy-Efficient Reconfigurable DTLS Cryptographic Engine for End-to-End Security in IoT Applications", IEEE International Solid-State Circuits Conference, Jan. 2018, pp. 42-44; 3 Pages.

Banerjee et al., "An Energy-Efficient Reconfigurable DTLS Cryptographic Engine for Securing Internet-of-Things Applications", IEEE Journal of Solid-State Circuits, Aug. 2019, vol. 54, No. 8; 14 Pages.

Banerjee et al., "eeDTLS: Energy-Efficient Datagram Transport Layer Security for the Internet of Things", IEEE, 2017 IEEE Global Communications Conference, Dec. 2017, pp. 1-6; 6 Pages.

Banerjee et al., "Energy-Efficient Protocols and Hardware Architectures for Transport Layer Security", Massachusetts Institute of Technology, Jun. 2017; 104 Pages.

Barker et al., "Recommendation for Random Number Generation Using Deterministic Random Bit Generators", National Institute of Standards and Technology, http://dx.doi.org/10.6028/NIST.SP.880-90Ar1, Jun. 2015, vol. 800-90A, Revision 1; 110 Pages.

Canright, David., "A Very Compact Rijndael S-box", Naval Postgraduate School Technical Report, May 17, 2005; 71 Pages.

Duran et al., A System-on-Chip Platform for the Internet of Things featuring a 32-bit RISC-V based Microcontroller, 2017 IEEE 8th Latin American Symposium on Circuits & Systems (LASCAS); Feb. 2017, pp. 1-4; https://ieeexplore.ieee.org/stamp/stamp.jsp?tp=&arnumber=8126878&isnumber=7948034; 4 Pages.

Dworkin, Morris, "Recommendation for Block Cipher Modes of Operation: Galois/Counter Mode (GCM) and GMAC", National Institute of Standards and Technology, Nov. 2007; vol. 800-38D, 39 Pages.

Fan et al., "State-of-the-Art of Secure ECC implementations: A Survey on Known Side/Channel Attacks and Countermeasures", IEEE, International Symposium on Hardware-Orientated Security and Trust (HOST), Jul. 2010, pp. 76-87, https://ieeexplore.ieee.org/stamp/stamp.isp?tp=&rnumber=5513110&isnumber=5513098; 12 Pages.

Guajardo et al., "Efficient Hardware Implementation of Finite Fields with Applications to Cryptography", ACTA Appl Math, Aug. 30, 2006, vol. 93, No. 1, pp. 75-118; https://doi.org/10.1007/s10440-006-9072-z; 44 pages.

Hamalainen et al, "Design and Implementation of Low-Area and Low-Power AES Encryption Hardware Core", IEEE, Ninth Euromicro Conference on Digital System Design: Architectures, Methods and Tools, Jan. 2006, pp. 577-583; 7 Pages.

Hedabou et al, Countermeasures for Preventing Comb Method Against SCA Attacks, Apr. 2005, vol. 3439, pp. 85-96; 12 Pages.

Hutter, et al., "A Cryptographic Processor for Low-Resource Devices: Canning ECDSA and AES Like Sardines", IFIP International Federation for Information Processing, Jun. 2011, vol. 6633, pp. 144-159; 16 Pages.

Hutter et al, "NaCl's Crypto-Box in Hardware", International Association of Cryptologic Research, Jun. 16, 2015, vol. 9293, pp. 81-101; 21 pages.

International Search Report and Written Opinion dated May 1, 2019, for Application No. PCT/US19/17658; 9 Pages.

Keoh et al., "Securing the Internet of Things: A Standardization Perspective", IEEE Internet of Things Journal, Jun. 2014, vol. 1, No. 3, pp. 265-275; https://ieeexplore.ieee.org/doi:10.1109/JIOT.2014.2323395; 11 Pages.

Matthew, et al., "53 Gbps Native GF $(2^4)^2$ Composite-Field AES-Encrypt/Decrypt Accelerator for Content-Protection in 45 nm High-Performance Microprocessors", IEEE Journal of Solid-State Circuits, Apr. 2011, vol. 46, No. 4, pp. 767-776; 10 Pages.

Matthew et al., "340 mV-1.1 V, 289 Gbps/W, 2900-Gate NanoAES Hardware Accelerator with Area-Optimized Encrypt/Decrypt GF $(2^4)^2$ Polynomials in 22 nm Tri-Gate CMOS", IEEE Journal of Solid-State Circuits, Apr. 2015, vol. 50, No. 4, pp. 1048-1058; 11 Pages.

Meyer et al., "Lessons Learned From Previous SSL/TLS Attacks A Brief Chronology of Attacks and Weaknesses", https://eprint.iacr.org/2013/049.pdf; Jan. 2013; 15 Pages.

National Institute of Standards and Technology (NIST), "Advanced Encryption Standard (AES)", Federal Information Processing Standards Publication 197, Nov. 26, 2001; 51 Pages.

Pessl et al., "Curved Tags—A Low Resource ECDSA implementation Tailored for RFID", Radio Frequency Identification: Security and Privacy Issues. RFIDSec 2014. Lecture Notes in Computer Science, vol. 8651, pp. 156-172: Nov. 15, 2014, https://doi.org/10.1007/978-3-319-13066-8_10.

Pornin, T., "Deterministic Usage of the Digital Signature Algorithm (DSA) and Elliptic Curve Digital Signature Algorithm (ECDSA)", RFC Aug. 2013, vol. 6979, pp. 1-79; 79 Pages.

Rescorla, E. et al., "Datagram Transport Layer Security Version 1.2", Internet Engineering Task Force (IETF), Jan. 2012, vol. 6347, pp. 1-32; 32 Pages.

Rescorla, E. et al., "The Datagram Transport Layer Security (DTLS) Protocol Version 1.3 draft-ietf-tls-dtlsl 3-18", Internet Engineering Task Force (IETF), Nov. 29, 2017, vol. 6347; 41 Pages.

Rescorla, E., et al., "The Transport layer Security (TLS) Protocol Version 1.3", Internet Engineering Task Force (IETF), Aug. 2018, vol. 8446; 160 Pages.

Roy et al., "Designing Tiny ECC Processor", Presentation at the 17th Workshop on Elliptic Curve Cryptography, Jan. 2013, 90 Pages.

Uytterhoeven, R. et al., "A Sub 10pj/cycle over a 2 to 200 MHz Performance Range RISC-V Microprocessor in 28 nm FDSOI", IEEE 44th European Solid-State Circuits Conference (ESSCIRC), Sep. 2018, pp. 236-239, https://ieeexplore.ieee.org/abstract/document/8494259; 4 Pages.

Waterman et al., The RISC-V Instruction Set Manual, vol. 1: User-Level ISA, Version 2.0, Electrical Engineering and Computer Sciences University of California at Berkeley, May 6, 2014, http://www.eecs.berkeley.edu/Pubs/TechRpts/2014/EECS-201 4-54.html; 102 Pages.

Zhang et al., "A Compact 446 Gbps/W AES Accelerator for Mobile SoC and IoT in 40nm", 2016 IEEE Symposium on VLSI Circuits (VLSI-Circuits), Jun. 2016; 2 Pages.

Zhang et al., Recryptor: A Reconfigurable In-Memory Cryptographic Cortex-M0 Processor for IoT, 2017 Symposium on VLSI Circuits Digest of Technical Papers, Jun. 8, 2017, pages C264-C265, https://ieeexplore.ieee.org/document/8008501; 2 Pages.

* cited by examiner

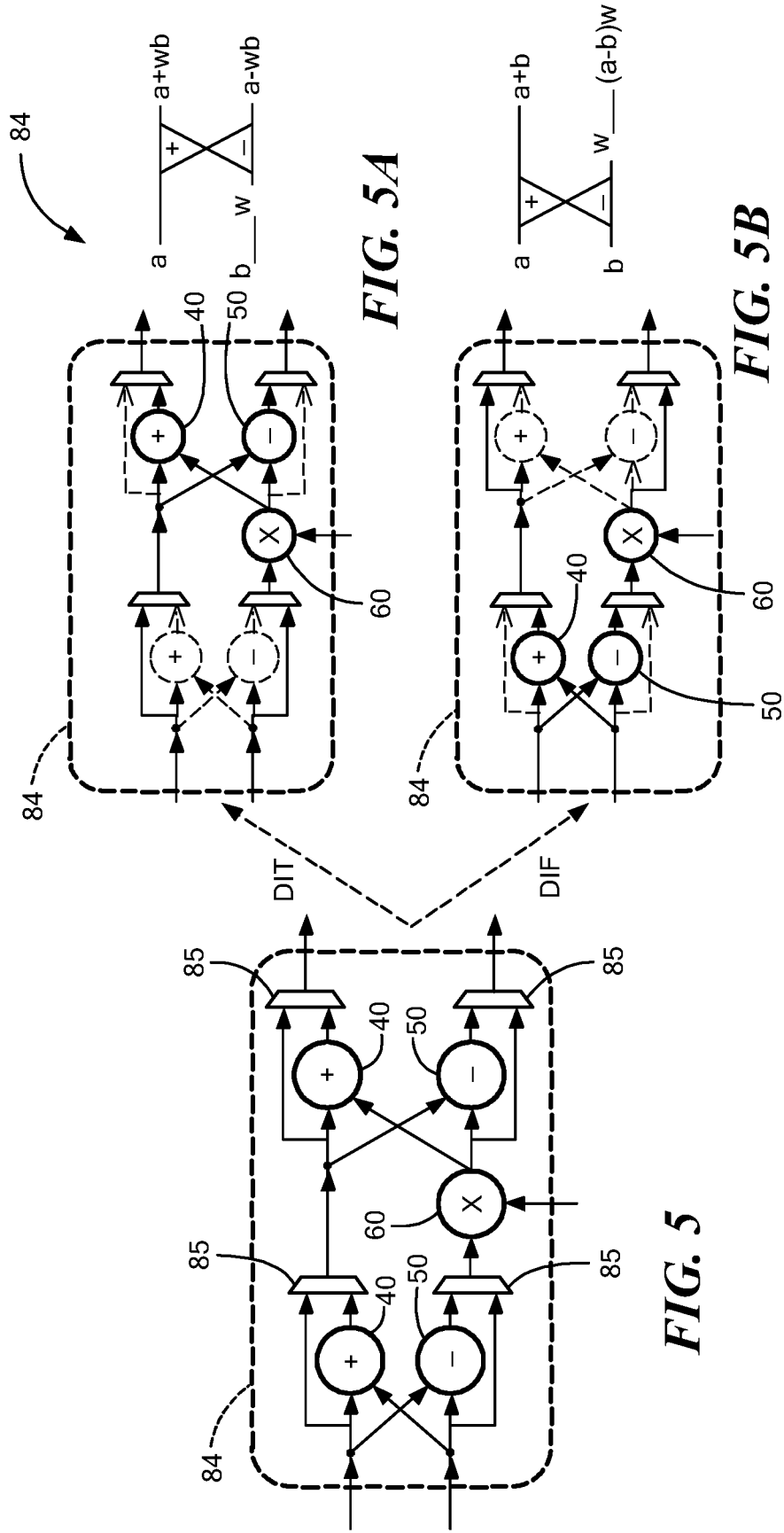

CONFIGURABLE LATTICE CRYPTOGRAPHY PROCESSOR FOR THE QUANTUM-SECURE INTERNET OF THINGS AND RELATED TECHNIQUES

CROSS-REFERENCE TO RELATED APPLICATION

This application claims the benefit of U.S. Provisional Application No. 62/807,470 filed Feb. 19, 2019, of which is hereby incorporated herein by reference in its entirety.

GOVERNMENT RIGHTS

Not applicable.

BACKGROUND

As is known in the art, modern public key cryptographic algorithms, such as the Rivest-Shamir-Adleman (RSA) algorithm and the elliptic curve cryptography (ECC) algorithm are expected to be rendered insecure when large-scale quantum computers are built (e.g. via application of by Shor's algorithm). Cryptographers are thus working on quantum-resistant cryptographic algorithms.

As is also known, lattice-based cryptography has emerged as a prime candidate to provide security against attacks using a quantum computer. Lattice-based cryptographic techniques, however, have a high degree of computational complexity. This high degree of computational complexity makes it challenging to implement lattice-based protocols on resource-constrained internet-of-things (IoT) devices which need to secure data against attacks launched using either classical or quantum computers.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

To address the challenge of implementing lattice-based protocols on resource-constrained internet-of-things (IoT) devices which need to secure data against both present and future adversaries, described herein is a lattice cryptography processor having configurable parameters.

In accordance with one aspect of the concepts described herein, a lattice cryptography processor includes one or more cache memories, a modular arithmetic unit (MAU) coupled to the one or more cache memories and configured to perform polynomial operations, a hashing and pseudo-random number generation (PRNG) processor coupled to MAU, a discrete distribution sampler for polynomial sampling coupled to the hashing and PRNG processor and an instruction memory.

With this particular arrangement, a configurable lattice cryptography processor is provided. The instruction memory is configured to have stored therein configurable parameters and/or custom instructions for polynomial sampling and/or arithmetic operations. Furthermore, the one or more cache memories may be provided as one or more single port random access memories (RAMs). The use of single port RAMs results in a lattice cryptography processor having an energy and space efficient architecture. In embodiments, a lattice cryptography processor having up to two orders of magnitude energy savings and 124 k-gate reduction compared with prior art lattice cryptography processors is provided. Thus, the configurable lattice cryptography processor described herein is suitable for implementing lattice-based protocols on resource-constrained internet-of-things (IoT) devices which area through architectural optimizations.

In embodiments, lattice cryptography processors further comprises a memory coupled to the MAU for storing parameters used for polynomial operations performed by the MAU. In embodiments, the memory is configured to have stored therein parameters used by the MAU to perform number theoretic transforms (NTT).

In embodiments, the MAU is provided having a unified butterfly architecture configurable to operate in either a decimation-in-frequency (DIF) mode or a decimation-in-time (DIT) mode in response to instructions and/or parameters provided thereto.

In embodiments, the configurable lattice cryptography processor utilizes a low-power modular arithmetic, area-efficient memory architecture and fast sampling techniques to achieve high energy-efficiency and low cycle count. Such a lattice cryptography processor is thus suitable for inclusion in embedded systems so as to secure such embedded systems and enable the embedded systems to operate as low-power embedded systems.

In embodiments, the cache, the core and the discrete distribution sampler have dedicated clock gates which can be independently configured for power savings.

In embodiments, the MAU comprises a modular adder, a modular subtractor and a modular or pseudo-configurable modular multiplier. Use of modular or a pseudo-configurable modular multiplier provides up to a three-time improvement in energy-efficiency compared with prior art lattice cryptography processors. Thus, providing the MAU from modular elements results in an MAU having a low-power characteristic.

In embodiments, the modular MAU may be used with a configurable prime modulus to accelerate polynomial arithmetic operations.

In embodiments, the one or more cache memories may each be provided as a single-port static RAM (SRAM)-based number theoretic transform (NTT) memory architecture. This approach results in a 124 k-gate area savings without any loss in performance or energy-efficiency compared with prior art approaches.

In embodiments, the sampler supports a plurality of discrete distribution parameters suitable for lattice-based schemes.

These efficient modular building blocks (i.e. adder, subtractor, multiplier, hash and PRNG processor and sampler) may be integrated together with the instruction memory and a decoder to provide a crypto-processor which can be programmed with custom instructions for polynomial sampling and arithmetic.

In embodiments, the lattice cryptography processor described herein may be configured to operate with a variety of lattice-based key encapsulation and signature protocols including but not limited to: Frodo, NewHope, qTESLA, CRYSTALS-Kyber and CRYSTALS-Dilithium. Furthermore, during such operation the crypto-processor may achieve an order of magnitude or more improvement in performance and energy-efficiency compared to state-of-the-art assembly-optimized software and hardware implementations executing the same protocols. Thus, in addition to being configurable, the described lattice cryptography processor is also provided as an energy-efficient lattice cryptography processor.

In accordance with a further aspect of the concepts described herein, an energy-efficient configurable lattice cryptography processor for the quantum-secure internet of things (IoT), the lattice cryptography processor comprising a cache, a modular arithmetic unit coupled to the cache, the modular arithmetic unit to perform polynomial operations including a number theoretic transform (NTT), a hash and PRNG processor core coupled to the cache for hashing and pseudo-random number generation, a sampler coupled to the core, an instruction memory configured to be programmed with custom instructions to implement various lattice-based algorithms, and wherein the polynomials are generated, or sampled, either uniformly through rejection sampling or from a discrete distribution, typically binomial, with a selected standard deviation.

In embodiments, the one or more cache memories, the hash and PRNG processor and the sampler have dedicated clock gates which can be independently configured for fine-grained power savings. In embodiments, the sampler is provided as a discrete distribution sampler configured to operate in a plurality of different sampling modes. In embodiments, the discrete distribution sampler is configured to operate in any of: a uniform sampling mode, a binomial sampling mode, a Gaussian sampling mode, a trinary sampling mode and a rejection sampling mode.

In embodiments, the lattice cryptography processor is provided as an integrated circuit. In embodiments, the lattice cryptography integrated circuit comprises hardware-accelerated quantum-resistant lattice-based cryptographic protocols that can be used to secure resource-constrained IoT devices.

In accordance with another aspect of the concepts described herein, a quantum-secure internet of things (IoT) device comprises a configurable modular lattice cryptography processor comprising one or more cache memories, a modular arithmetic unit (MAU) coupled to the cache and configured to perform polynomial operations including a number theoretic transform (NTT), a core, coupled to the cache, the core for hashing and pseudo-random number generation (PRNG), a discrete distribution sampler coupled to the core wherein the cache, the core and the discrete distribution sampler have dedicated clock gates which can be independently configured for fine-grained power savings, an instruction memory configured to be programmed with custom instructions to implement a plurality of different lattice-based algorithms.

In embodiments, the MAU is configured to perform number theoretic transforms (NTT). In embodiments, the polynomials may be generated, or sampled, either uniformly through rejection sampling or from a discrete distribution, typically binomial, with a selected standard deviation; and computing a convolution of two polynomials involves transforming the polynomials to an NTT domain followed by coefficient-wise multiplication and an inverse.

In embodiments, the configurable modular arithmetic unit is provided in a butterfly configuration and may be configured to operate in either of: a DIF mode; or a DIT mode.

In accordance with a still further aspect of the concepts described herein, a discrete distribution sampler comprises a pseudo-random number generator (PRNG) core, means, coupled to an output of the PRNG core, for applying a bit mask to an output signal provided at the output of the PRNG core; a sampler circuit coupled to receive an output of the means for applying a bit mask and to provide a sampled output signal at a sampler circuit output; and a combiner configured to receive and combine sampled output signals from the sampler circuit output and to provide a combiner output signal.

In embodiments, the discrete distribution sampler is configured to operate as any of: a rejection sampler; a binomial sampler; a uniform sampler; a Gaussian sampler; and a trinary sampler.

Described is a lattice cryptography processor with configurable parameters. The lattice cryptography processor includes a sampling circuit configured to operate in accordance with a Secure Hash Algorithm 3 (SHA-3)-based pseudo-random number generator (PRNG), a single-port random access memory (RAM)-based number theoretic transform (NTT) memory architecture and a modular arithmetic unit. The described lattice cryptography processor is configured to be programmed with custom instructions for polynomial arithmetic and sampling. The configurable lattice cryptography processor may operate with lattice-based CCA-secure key encapsulation and a variety of different lattice-based protocols including, but not limited to: Frodo, NewHope, qTESLA, CRYSTALS-Kyber and CRYSTALS-Dilithium, achieving up to an order of magnitude improvement in performance and energy-efficiency compared to state-of-the-art hardware implementations.

Operating with a SHA-3-based PRNG provides two orders of magnitude energy savings compared with prior art lattice cryptography processors. Use of a single-port RAM-based number theoretic transform (NTT) memory architecture results in a 124 k-gate area savings compared with prior art lattice cryptography processors. The modular arithmetic unit accelerates polynomial computations and may be provided as a low-power modular arithmetic unit.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 5 is a block diagram of a unified butterfly circuit;

FIG. 5A is a block diagram of the unified butterfly circuit configured for operation in a decimation-in-time (DIT) mode;

FIG. 5B is a block diagram of the unified butterfly circuit configured for operation in a decimation-in-frequency (DIF) mode;

DETAILED DESCRIPTION

Figure 1:
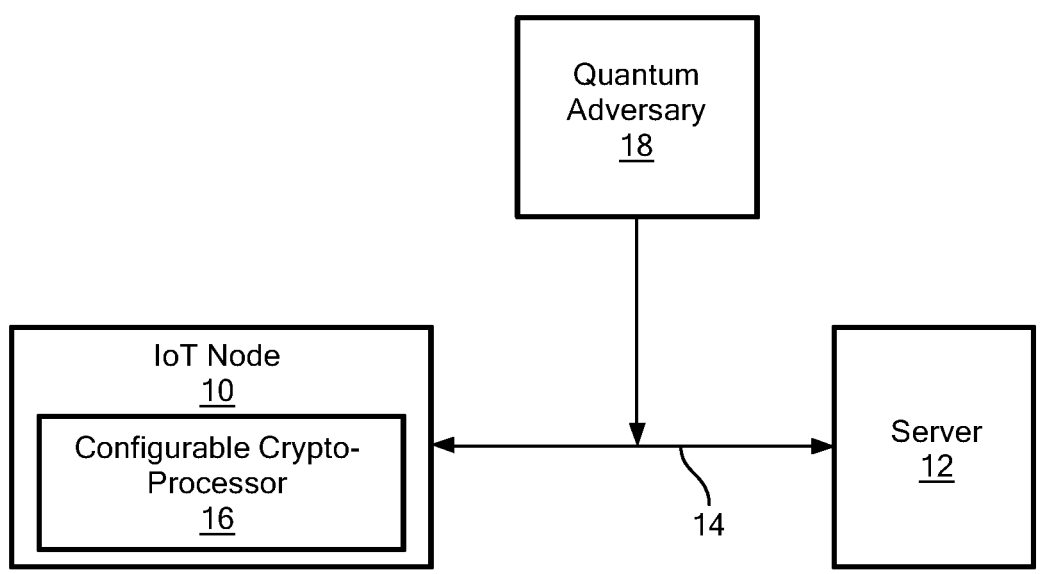
FIG. 1 is a block diagram of a system comprising an internet of things (IoT) device which includes a configurable lattice-based cryptography processor.

Before describing a configurable lattice-based cryptography processor (or more simply a "crypto-processor") and the operation thereof, some introductory terms are explained.

Bold lower-case symbols are used herein to denote vectors and bold upper-case symbols to denote matrices. The symbol lg is used to denote all logarithms with base 2. The set of all integers is denoted as Z and the quotient ring of integers modulo q is denoted as $Z_q$. For two n-dimensional vectors a and b, their inner product is written as $<a, b> = \sum_{i=0}^{n-1} a_i \cdot b_i$. The concatenation of two vectors a and b is written as a∥b.

Reference is made herein to the Learning with Errors (LWE) problem. The LWE problem acts as the foundation for several modern lattice-based cryptography schemes. The LWE problem states that given a polynomial number of samples of the form (a, <a, s>+e), it is difficult to determine the secret vector $s \epsilon Z_q^n$, where the vector $a \epsilon Z_q^n$ is sampled uniformly at random and the error e is sampled from the appropriate error distribution x. Examples of secure LWE parameters are (n, q)=(640, $2^{15}$) and (n, q)=(976, $2^{16}$) for Frodo.

LWE-based cryptosystems involve large matrix operations which are computationally expensive and also result in large key sizes. To solve this problem, the Ring-LWE problem was proposed, which uses ideal lattices. Let $R_q = Z_q[x]/(x^n+1)$ be the ring of polynomials where n is power of 2. The Ring-LWE problem states that given samples of the form (a, a·s+e), it is difficult to determine the secret polynomial $s \subset R_q$, where the polynomial $a \epsilon R_q$ is sampled uniformly at random and the coefficients of the error polynomial e are small samples from the error distribution x. Examples of secure Ring-LWE parameters are (n, q)=(512, 12289) and (n, q)=(1024, 12289) for NewHope.

Module-LWE provides a middle ground between LWE and Ring-LWE. By using module lattices, it reduces the algebraic structure present in Ring-LWE and increases security while not compromising too much on the computational efficiency. The Module-LWE problem states that given samples of the form (a, $a^T$s+e), it is difficult to determine the secret vector $s \epsilon R_q^k$, where the vector $a \epsilon R_q^k$ is sampled uniformly at random and the coefficients of the error polynomial e are small samples from the error distribution x. Examples of secure Module-LWE parameters are (n, k, q)=(256, 2, 7681), (n, k, q)=(256, 3, 7681) and (n, k, q)=(256, 4, 7681) for CRYSTALS-Kyber.

Reference is sometimes made herein to the Number Theoretic Transform (NTT). While the protocols based on standard lattices (LWE) involve matrix-vector operations modulo q, all the arithmetic is performed in the ring of polynomials $R_q = Z_q[x]/(x^n+1)$ when working with ideal and module lattices. There are several efficient algorithms for polynomial multiplication and the Number Theoretic Transform (NTT) is one such technique widely used in lattice-based cryptography.

The NTT is a generalization of the well-known Fast Fourier Transform (FFT) where all the arithmetic is performed in a finite field instead of complex numbers. Instead of working with powers of the n-th complex root of unity $\exp(-2\pi j/n)$, NTT uses the n-th primitive root of unity $\omega_n$ in the ring $Z_q$, that is, $\omega_n$ is an element in $Z_q$ such that $\omega_n^n = 1$ mod q and $\omega_i^n \neq 1$ mod q for i≠n. In order to have elements of order n, the modulus q is chosen to be a prime such that q≡1 mod n. A polynomial a(x) E $R_q$ with coefficients $a(x)=(a_0, a_1, \ldots, a_{n-1})$ has the NTT representation $\hat{a}(x)=(\hat{a}_0, \hat{a}_1, \ldots \hat{a}_{n-1})$, where $$\hat{a}_i = \sum_{j=0}^{n-1} w_n^{ij} \bmod q \, \forall i \epsilon [0, n-1]$$

The inverse NTT (INTT) operation converts $\hat{a}(x)=(\hat{a}_0, \hat{a}_1, \ldots \hat{a}_{n-1})$ back to a(x) as:

$$a_i = \frac{1}{n} \sum_{j=0}^{n-1} \hat{a}_j w_n^{-ij} \bmod q \, \forall \, i \in [0, n-1]$$

Note that the INTT operation is similar to NTT, except that $\omega_n$ is replaced by $\omega_n^{-1}$ mod q and the final results is divided by n. The PolyBitRev function performs a permutation on the input polynomial a such that $\hat{a}[i]=\text{PolyBitRev}(a)[i]=a[\text{BitRev}(i)]$, where BitRev is formally defined as:

$$\text{BitRev}(i) = \sum_{j=0}^{\lg n-1} ((i>>j)\&1)<<\lg n-1-i))$$

for positive integer i and power-of-two n; that is, bit-wise reversal of the binary representation of the index i. Since there are lg n stages in the NTT outer loop, with O(n) operations in each stage, its time complexity is O(n lg n). The factors ω are called the twiddle factors, similar to FFT.

The NTT provides a fast multiplication algorithm in $R_q$ with time complexity O(n lg n) instead of O($n^2$) for schoolbook multiplication. Given two polynomials a, $b \epsilon R_q$, their product $c = a \cdot b \epsilon R_q$ can be computed as:

$$c = INTT(NTT(a) \odot NTT(b))$$

where ⊙ denotes coefficient-wise multiplication of the polynomials. Since the product of a and b, before reduction modulo $f(x)=x^n+1$, has 2n coefficients, using the above equation directly to compute a·b will require padding both a and b with n zeros. To eliminate this overhead, the negative-wrapped convolution is used, with the additional requirement q≡1 mod 2n so that both the n-th and 2n-th primitive roots of unity modulo q exist, respectively denoted as $\omega_n$ and $\psi = \text{sqrt}(w_n)$ mod q. By multiplying a and b coefficient-wise by powers of i before the NTT computation, and by multiplying INTT(NTT(a) 0 NTT(b)) coefficient-wise by powers of $\psi^{-i}$ mod q, no zero padding is required and the n-point NTT can be used directly.

Similar to FFT, the NTT inner loop involves butterfly computations. There are two types of butterfly operations—Cooley-Tukey (CT) and Gentleman-Sande (GS). The CT butterfly-based NTT requires inputs in normal order and generates outputs in bit-reversed order, similar to the decimation-in-time FFT. The GS butterfly-based NTT requires inputs to be in bit-reversed order while the outputs are generated in normal order, similar to the decimation-in-frequency FFT. Using the same butterfly for both NTT and INTT requires a bit-reversal permutation. However, the bit-reversal can be avoided by using CT for NTT and GS for INTT With respect to sampling, in lattice-based protocols, the public vectors a are generated from the uniform distribution over $Z_q$ through rejection sampling. The secret vectors s and error terms e are sampled from the distribution x typically with zero mean and appropriate standard deviation a. Accurate sampling of s and e is important to the security of these protocols, and the sampling must be constant-time to prevent side-channel leakage of the secret information.

Referring now to FIG. 1, an internet of things (IoT) node (or device) 10 is in communication with a server 12 over a communication path 14 (e.g. an IoT network or communication path which includes the Internet). IoT node 10 includes a configurable lattice-based cryptography processor 16. Details of a configurable lattice-based cryptography processor which may be the same as or similar to configurable lattice-based cryptography processor 16 will be described herein below in conjunction with FIGS. 2-9. Suffice it here to say that lattice-based cryptography processor 16 secures IoT device from an adversary 18 (i.e. makes IoT device resistant to attacks from adversary 18) which may be utilizing either a classical computer or a quantum computer 18. Thus, lattice-based cryptography processor 16 secures data against attacks launched using either classical or quantum computers (i.e. cryptography processor 16 provides both classical and quantum-resistant security for IoT networks).

Figure 2:
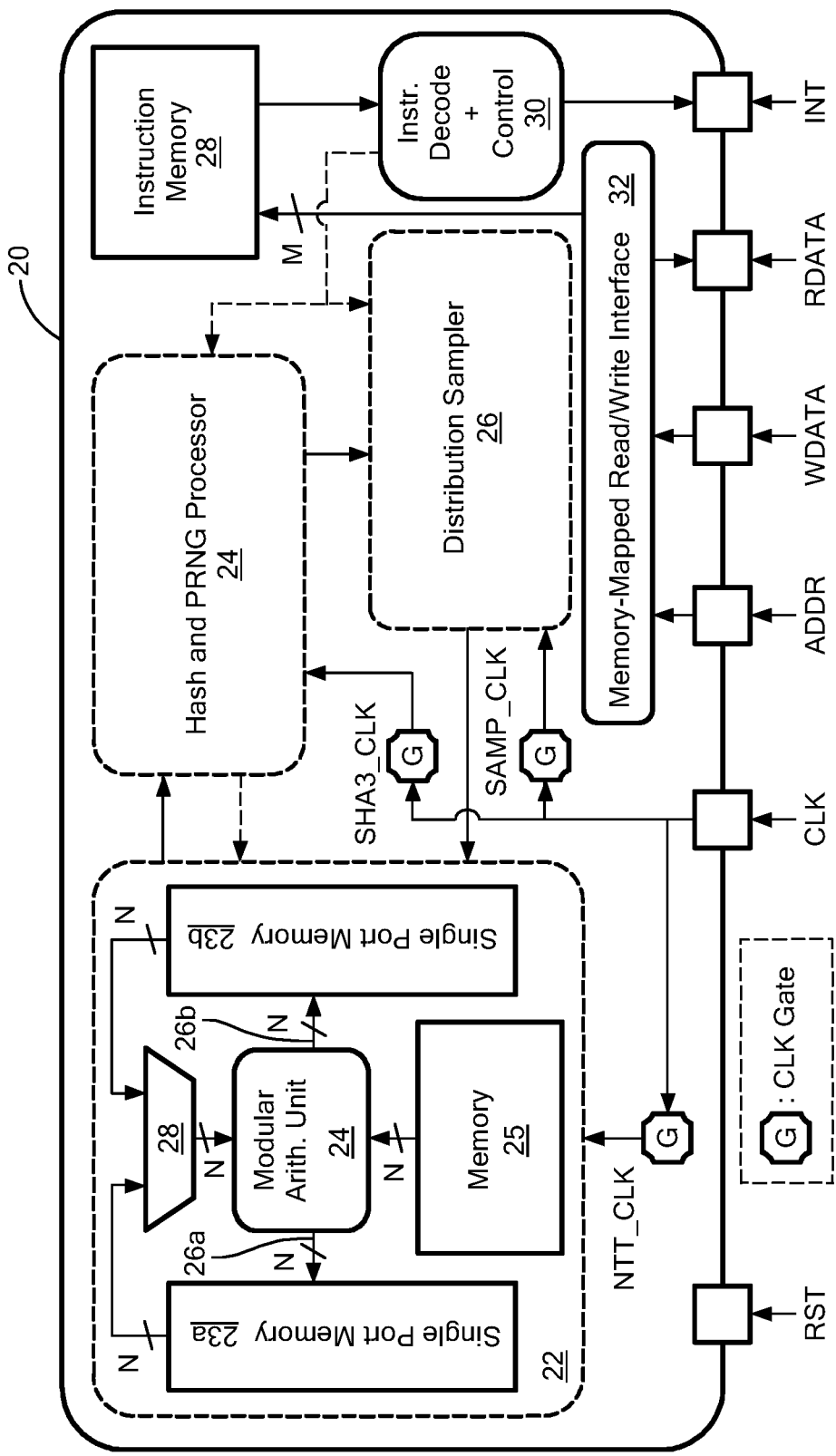
FIG. 2 is a block diagram of a configurable lattice cryptographic processor.

Referring now to FIG. 2, a configurable lattice-based cryptography processor 20 (also referred to as "cryptographic processor 20" or more simply "crypto-processor 20"), which may be the same as or similar to configurable lattice-based cryptography processor 16 in FIG. 1 comprises an arithmetic and logic unit (ALU) 22 which includes a modular arithmetic unit (MAU) 24 coupled to a pair of single port memories 23a, 23b over respective ones of N-bit buses 26a, 26b. In embodiments, the buses may be provided as 24 bit buses although any size buses may also be used. One of ordinary skill in the art will recognize how to select a bus size for any particular application. MAU 24 may be provided from efficient building blocks (e.g. arithmetic circuits such as adder, subtractor and multiplier circuits) which will be described in detail in conjunction with FIGS. 3-9.

Single port memories 23a, 23b are also coupled to a combiner 28, the output of which is coupled to MAU 24. Also coupled to MAU 24 is a memory 25. Memory 25 is configured to have stored therein data (e.g. programmable parameters and/or programmable instructions) needed by MAU 28 to perform certain operations such as polynomial computations, for example.

Crypto-processor 20 further includes a hash/pseudo-random number generation processor 24 (hash/PRNG processor 24) which is used for hashing and pseudo-random number generation (PRNG). Hash/PRNG processor 24 receives an input from ALU 22 and generates values which are provided to a discrete distribution sampler 26. An illustrative discrete distribution sampler 26 will be described herein below in conjunction with FIG. 9. Briefly, however, polynomials may be generated, or "sampled" by sampler 26 using a variety of techniques.

Crypto-processor 20 may further include an instruction memory 28 which is configured to have stored therein programmable parameters and/or programmable instructions and/or custom instructions to implement a plurality of lattice-based algorithms. In embodiments, memory 28 may be programmed such that a plurality of different parameters and/or instructions may be stored therein to control the operation of crypto-processor 20.

In one example embodiment, memory 28 may comprise a 1 KB instruction memory which can be programmed with custom instructions to implement various lattice-based algorithms. In one embodiment, parameters and/or instructions from memory 28 may be used to configure crypto-processor 20 to perform a Ring-Learning with Errors (Ring-LWE) computation. In this example embodiment, memories 23a, 23b may be provided as 24 KB LWE cache memories which interface with MAU 24 to perform polynomial operations including the number theoretic transform (NTT). In this example, memory 25 may thus have stored therein number theoretic transform (NTT) constants used by MAU 24 to perform polynomial operations including the number theoretic transform (NTT).

In embodiments, hash/PRNG processor 24 (also sometimes referred to herein as hash/PRNG core) may comprise an energy-efficient Keccak-f[1600] core, used for hashing and pseudo-random number generation (PRNG). The hash/PRNG core 24 drives the discrete distribution sampler 26.

It should be noted that in embodiments, the LWE cache, the core and the sampler may have dedicated clock gates which can be independently configured to achieve fine-grained power savings.

As illustrated in FIG. 2, processors 22, 24 and distribution sampler 26 are integrated with the instruction memory 28 and an instruction decoder 30 to form the core of the crypto-processor 20. With this architecture, crypto-processor 20 can be programmed using an interface 32. In embodiments, interface 32 may be provided as a 32-bit custom instruction interface used to configure crypto-processor 20 to perform different polynomial arithmetic, transform and sampling operations, as well as simple branching.

For example, the following instructions may be provided to memory 28 through interface 32 to configure crypto-processor 20 to generate polynomials a, s, e∈$R_q$, and calculate a s+e, which is a typical computation in the Ring-LWE-based scheme NewHope-1024:

config(n=1024, q=12289)
sample_a
rej_sample(pmg=SHAKE-128, seed=r0, c0=0, c1=0, poly=0)
sample_s
bin_sample(prg=SHAKE-256, seed=r1, c0=0, c1=0, k=8, poly=1)
sample_e
bin_sample(pmg=SHAKE-256, seed=r1, c0=0, c1=1, k=8, poly=2)
ntt_s
mult_psi(poly=1)
transform(mode=DIF_NIT, poly_dst=4, poly_src=1)
a_mul_s
poly_op(op=MUL, poly_dst=0, poly_src=4)
intt_a_mul_s
transform(mode=DIT_INIT, poly_dst=5, poly_sc=0)
mult_psi_inv(poly=5)
a_mul_s_plus_e
poly_op(op=ADD, poly_dst=1, poly_src=5)

The config instruction is first used to configure the protocol parameters n and q which, in this example, are the parameters from NewHope-1024. For n=1024, the polynomial cache is divided into 8 polynomials, which are accessed using the poly argument in all instructions. For sampling, the seed can be chosen from a pair of registers (e.g. registers r0 and r1 described in FIG. 9), while two registers c0 and c1 are used as counters for sampling multiple polynomials from the same seed. In one example embodiment, registers r0 and r1 may be provided as 256-bit registers and registers c0 and c1 may be provided as 16-bit registers. For coefficient-wise operations poly_op, the poly_src argument indicates the first source polynomial while the poly_dst argument is used to denote the second source (and destination) polynomial. Similarly, the following set of instructions may be used to generate matrix of polynomials $A \in R_q^{2 \times 2}$ and vectors of polynomials s, $e \in R_q^2$, and calculate A·s+e, which is a typical computation in the Module-LWE-based scheme CRYSTALS-Kyber-512:
config (n=256, q=7681)
sample_s
bin_sample (pmg=SHAKE-256, seed=r1, c0=0, c1=0, k=3, poly=4)
bin_sample (pmg=SHAKE 256, seed=r1, c0=0, c1=1, k=3, poly=5)
sample e
bin sample (pmg=SHAKE-256, seed=r1, c0=0, c1=2, k=3, poly=24)
bin_sample (pmg=SHAKE-256, seed=r1, c0=0, c1=3, k=3, poly=25)
ntt_s
mult_psi(poly=4)
transform(mode=DIF_NIT, poly_dst=16, poly_src=4)
mult_psi(poly=5)
transform (mode=DIF_NIT, poly_dst=17, poly_src=5)
sample_A0
rej_sample (pmg=SHAKE-128, seed=r0, c0=0, c1=0, poly=0)
rej_sample (pmg=SHAKE-128, seed=r0, c0=1, c1=0, poly=1)
A0_mul_s
poly_op(op=MUL, poly_dst=0, poly_src=16)
poly_op(op=MUL, poly_dst=1, poly_src=17)
init(poly=20)
poly_op(op=ADD, poly_dst=20, poly_src=0)
poly_op(op=ADD, poly_dst=20, poly_src=1)
sample_A1
rej_sample(pmg=SHAKE-128, seed=r0, c0=0, c1=1, poly=0)
rej_sample(pmg=SHAKE-128, seed=r0, c0=1, c1=1, poly=1)
A1_mul_s
poly_op(op=MUL, poly_dst=0, poly_src=16)
poly_op(op=MUL, poly_dst=1, poly_src=17)
init(poly=21)
poly op(op=ADD, poly_dst=21, poly_src=0)
poly_op(op=ADD, poly_dst=21, poly_src=1)
intt_A_mul_s
transform (mode=DIT_INTT, poly_dst=8, poly_src=20)
mult_psi_inv (poly=8)
transform(mode=DIT_INIT, poly_dst=9, poly_src=21)
mult_psi_inv (poly=9)
poly_op(op=ADD, poly_dst=24, poly_src=8)
poly_op(op=ADD, poly_dst=25, poly_src=9)

In this example, parameters from CRYSTALS-Kyber-512 have been used. For n=256, the polynomial cache is divided into 32 polynomials, which are again accessed using the poly argument. The init instruction is used to initialize a specified polynomial with all zero coefficients. The matrix A is generated one row at a time, following a just-in-time approach instead of generating and storing all the rows together, to save memory which becomes especially useful when dealing with larger matrices such as in CRYSTALS-Kyber-1024 and CRYSTALS-Dilithium-IV. A script (e.g. a Perl script) may be implemented to parse such plain-text programs and convert them into 32-bit binary instructions which can be decoded by crypto-processor 20.

In one embodiment, an integrated circuit (or "chip") was fabricated using a TSMC 40 nm LP CMOS process, which resulted in a placed-and-routed design of the core comprising of 106 k logic gates (76 kGE for synthesized design) and 40.25 KB SRAM, with a total area of 0.28 mm$^2$ (logic and memory combined). The chip supports supply voltage scaling from 0.68 V to 1.1 V.

Although one design objective was to demonstrate a configurable lattice cryptography processor, the architecture described herein can be easily scaled for more specific parameter sets. For example, in order to accelerate only NewHope-512 (n=512, q=12289), size of the polynomial cache can be reduced to 6.5 KB (=8×512×13 bits) and the pre-computed NTT constants can be hard-coded in logic or stored in a read only memory (ROM) (e.g. a 2.03 KB ROM (=2.5×512×13 bits)) rather than in an SRAM (e.g. a 15 KB SRAM). Also, the modular arithmetic logic in ALU 22 can be simplified significantly to work with a single prime only, for example.

In one embodiment, the lattice cryptography processor occupies 106$k$ NAND Gate Equivalents (GE), uses 40.25 KB of SRAM and has an average power of 516 μW when performing the NewHope post-quantum key exchange. Thus, through architectural and algorithmic improvements, a practical hardware-accelerated quantum-resistant lattice-based cryptographic processor is realized.

It should be noted that all hardware measurements of the chip referred to herein were made at a frequency of 12 MHz and a supply voltage of 0.68V.

As will be explained in detail below, MAU 24 is provided from modular arithmetic elements and thus may be referred to as a modular arithmetic core 24. The modular arithmetic core 24 comprises an adder (FIG. 3) a subtractor (FIG. 3A) and a multiplier (FIGS. 4, 4A) along with associated modular reduction logic. In embodiments, the adder may be provided as a 24-bit adder, the subtractor may be provided as a 24-bit subtractor and the multiplier may be provided as a 24-bit multiplier along with associated modular reduction logic.

Figure 3:
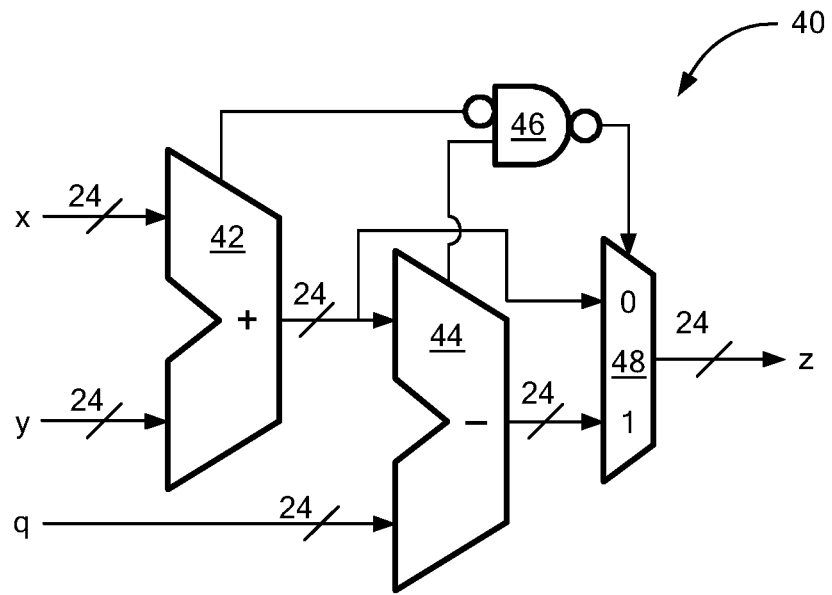
FIG. 3 is a block diagram of a modular adder with configurable modulus q.
Figure 3A:
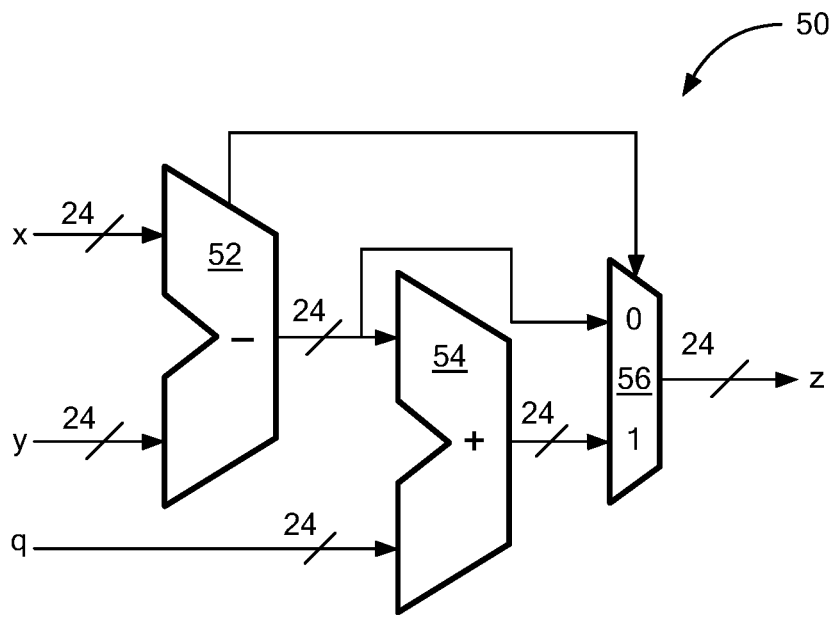
FIG. 3A is a block diagram of a modular subtractor with configurable modulus q.

Referring now to FIGS. 3 and 3A, shown are an illustrative modular adder (FIG. 3) and a modular subtractor (FIG. 3A). Also shown in Algorithms 2 and 3 are the corresponding pseudo-codes.

| Algorithm 2 Modular Addition |
| --- |
| Require: x, y, $\in \mathbb{Z}_q$<br>Ensure: z = x + y mod q<br>1: (c, s) ← x + y<br>2: (b, d) ← s − q<br>3: if c = 1 or b = 0 then<br>4:    z ← d<br>5: else<br>6:    z ← s<br>7: end if<br>8: return z |

| Algorithm 3 Modular Subtraction |
| --- |
| Require: x, y, $\in \mathbb{Z}_q$<br>Ensure: z = x − y mod q<br>1: (b, d) ← x − y<br>2: (c, s) ← d + q<br>3: if b = 1 then<br>4:    z ← s<br>5: else<br>6:    z ← d |

-continued

Algorithm 3 Modular Subtraction

7: end if
8: return z

Both designs use a pair of adder and subtractor circuits, with the sum, carry bit, difference and borrow bit denoted as s, c, d and b respectively. Modular reduction may be performed using conditional subtraction and addition, which are computed in the same cycle to avoid timing side-channels. In one embodiment, the synthesized areas of the adder and the subtractor are around 550 gate equivalents (GE) each in area.

Figure 4:
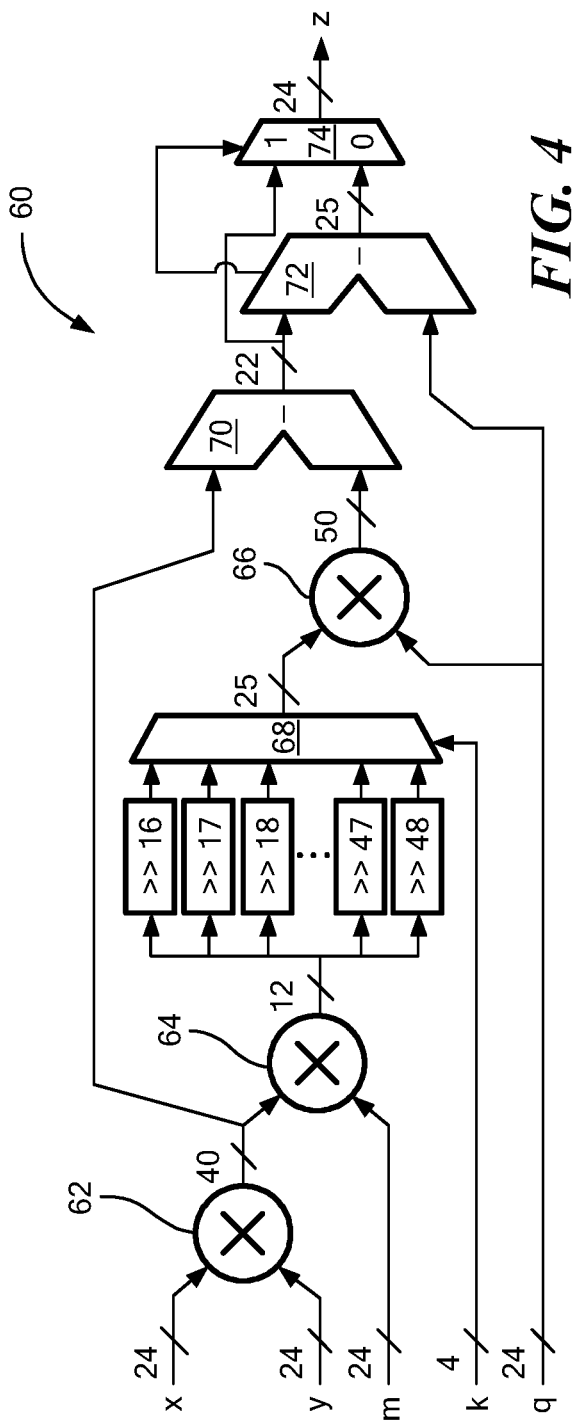
FIG. 4 is a block diagram of a single-cycle modular multiplier architecture with fully configurable modulus for Barrett reduction.

Referring now to FIG. 4, a modular multiplication circuit 60 (also referred to as modular multiplier 60) comprises a total of 3 multipliers 62, 64, 66. In one embodiment, for modular multiplication, a 24-bit multiplier may be used followed by Barrett reduction modulo a prime q of size up to 24 bits. Barrett reduction does not exploit any special property of the modulus q, thus making it ideal for supporting configurable moduli. Let z be the 48-bit product to be reduced to $\mathbb{Z}_q$, then Barrett reduction computes z mod q by estimating the quotient [z/q] without performing any division, as shown in Algorithm 4.

Algorithm 4 Modular Multiplication with Barret Reduction [Bar86]

Require: x, y ∈ $\mathbb{Z}_q$, m and k such that m = $[2^k/q]$
Ensure: z = x · y mod q
1: z ← x · y
2: t ← (z · m) ≫ k
3: z ← z − (t · q)
4: if z ≥ q then
5:   z ← z − q
6: end if
7: return z Barrett reduction involves two multiplications, one subtraction, one bit-shift and one conditional subtraction. The value of 1/q is approximated as $m/2^k$, with the error of approximation being $e=1/q-m/2^k$, therefore the reduction is valid as long as ze<1.

Since $z<q^2$, k is set to be the smallest number such that $e=1/q-(^{537}2k/q^⌈/2^k)<1/q^2$. Typically, k is very close to $2^{⌈lq⌉}$, that is, the bit-size of $q^2$.

Figure 4A:
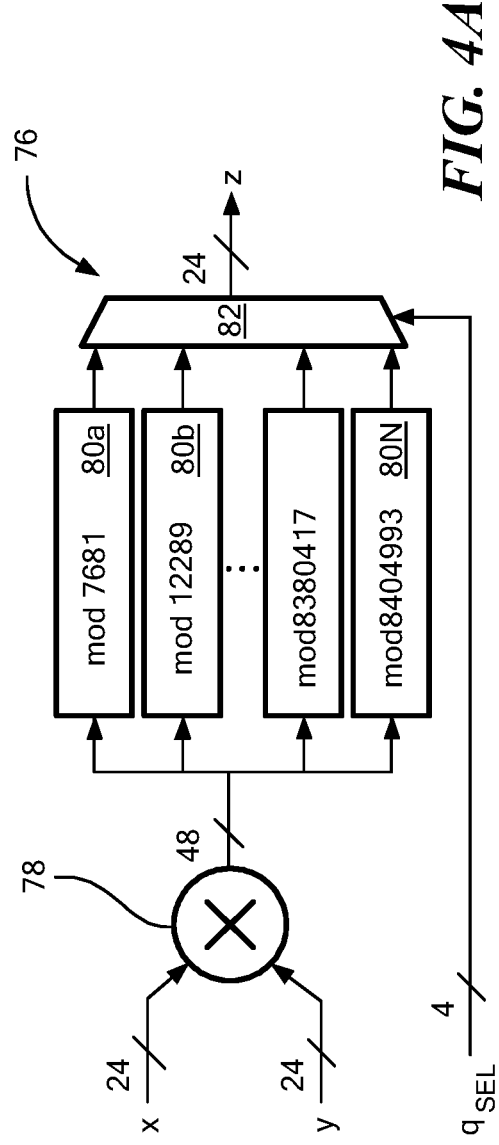
FIG. 4A is a block diagram of a single-cycle modular multiplier architectures with pseudo-configurable modulus for Barrett reduction.

In order to understand the trade-offs between flexibility and efficiency in modular multiplication, one can implement two different architectures of Barrett reduction logic: (1) with fully configurable modulus (q can be an arbitrary prime) and (2) with pseudo-configurable modulus (q belongs to a specific set of primes), as shown in FIGS. 4 and 4A, respectively.

Apart from the prime q (which can be up to 24 bits), the fully configurable version requires two additional inputs m and k such that $m=⌊2^k/q⌋$ (m and k are allowed to be up to 24 bits and 6 bits respectively).

With further reference to FIG. 4, the multiplier 60 comprises a total of 3 multipliers. The first two multipliers are used to compute z=x·y and z·m respectively. For obtaining t=(z·m)>>k, the bit-wise shift is implemented purely using combinational logic (multiplexers) because shifting bits sequentially in registers can be extremely inefficient in terms of power consumption. It is assumed that 16<k<48 since q is not larger than 24 bits, q is typically not smaller than 8 bits and it is known that k≈$2^{⌈lg\ q^{538}⌉}$. The third multiplier is used to compute t·q, and a pair of subtractors is used to calculate z−(t·q) and perform the final reduction step.

All the steps are computed in a single cycle to avoid any potential timing side-channels. The design was synthesized at 100 MHz (with near-zero slack) and occupies around 11 k GE area, which includes the area (around 4 k GE) of the 24-bit multiplier used to compute z=x·y.

The pseudo-configurable modular multiplier 76 implements Barrett reduction logic for the following prime numbers: 7681 (CRYSTALS-Kyber), 12289 (NewHope), 40961 (R.EMBLEM), 65537 (pqNTRUSign), 120833 (Ding Key Exchange), 133121/184321 (LIMA), 8380417 (CRYSTALS-Dilithium), 8058881 (q LESLA v1.0) and 4205569/4206593/8404993 (q LESLA v2.0).

As shown in FIG. 4A, there is a dedicated reduction block 80a-80N for each of these primes, and the $q_{SEL}$ input is used to select the output of the appropriate block while the inputs to the other blocks are data-gated to save power. Since the reduction blocks have the parameters m, k and q coded in digital logic and do not require explicit multipliers, they involve lesser computation than the fully configurable reduction circuit from FIG. 4, albeit at the cost of some additional area and decrease in flexibility.

The reduction becomes particularly efficient when at least one of m and q or both can be written in the form $2^{l_1}+/-2^{l_2}+/- \ldots +/-1$, where $l_1, l_2, \ldots$ are not more than four positive integers. For example, considering the CRYSTALS primes: for $q=7681=2^{13}-2^9+1$ one has k=21 and $m=273=2^8+2^4+1$, and for $q=8380417=2^{23}-2^{13}+1$ one has k=46 and $m=8396807=2^{23}+2^{13}+2^3-1$. Therefore, the multiplications by q and m can be converted to significantly cheaper bit-shifts and additions/subtractions, as shown in Algorithms 5 and 6.

Algorithm 5 Reduction mod 7681

Require: q = 7681, x ∈ $[0, q^2)$
Ensure: z = x mod q
1: t ← (x ≪ 8) + (x ≪ 4) + x
2: t ← t ≫ 21
3: t ← (t ≪ 13) − (t ≪ 9) + t
4: z ← x − t
5: if z ≥ q then
6:   z ← z − q
7: end if
8: return z Algorithm 6 Reduction mod 8380417

Require: q = 8380417, x ∈ $[0, q^2)$
Ensure: z = x mod q
1: t ← (x ≪ 23) + (x ≪ 13) + x ≪ 3) − x
2: t ← t ≫ 46
3: t ← ( t ≪ 23) − ( t ≪ 13) + (x ≪ 3) − x
4: z ← x − t
5: if z ≥ q then
6:   z ← z − q
7: end if
8: return z The pseudo-configurable modular multiplier 76 also performs modular multiplication in a single cycle. It one embodiment the design was synthesized at 100 MHz (with near-zero slack) and occupies around 19 k GE area, including the area of the 24-bit multiplier.

In comparing simulated energy consumption of a fully configurable and a pseudo-configurable modular multiplier architectures for all the primes mentioned herein it was found that the multiplication operation itself consumes the same energy in both cases (i.e. in both the fully configurable and a pseudo-configurable modular multiplier architectures), but the modular reduction energy is up to 6× lower for the pseudo-configurable design. The overall decrease in modular multiplication energy, considering both multiplication and reduction together, is up to 3×, clearly highlighting the benefit of the dedicated modular reduction data-paths when working with prime moduli. For reduction modulo $2^m$ (m<24), e.g., in the case of Frodo, the output of a 24-bit multiplier is simply bit-wise AND-ed with 2m−1 implying that the modular reduction energy is negligible.

Referring now to FIGS. 5-5B described are the manner in which the above-described modular adder, subtractor and multiplier circuits may be integrated together to build a unified butterfly module (FIG. 5) for use in MAU 24 (FIG. 2) in performing NTT operations. It is noted that NTT computations involve butterfly operations similar to the Fast Fourier Transform, with the only difference being that all arithmetic is performed modulo q instead of complex numbers. As illustrated in FIGS. 5A, 5B, there are two butterfly configurations.

Referring to FIG. 5A a butterfly module configured for decimation-in-time (DIT) operation (also referred to as a Cooley-Tukey configuration) computes the quantity (a+wb mod q, a−wb mod q), where a and b are the inputs to the butterfly and w is the twiddle factor.

Referring now to FIG. 5B, a butterfly module configured for decimation-in-frequency (DIF) operation (also referred to as a Gentleman-Sande configuration) computes (a+b mod q, (a−wb mod q), where a and b are the inputs to the butterfly and w is the twiddle factor.

It should be noted that the DIT butterfly (FIG. 5A) requires inputs to be in bit-reversed order and the DIF butterfly (FIG. 5B) generates outputs in bit-reversed order, thus making DIF and DIT suitable for NTT and INTT respectively.

While software implementations have the flexibility to program both configurations, hardware designs typically implement either DIT or DIF, thus requiring bit-reversals. To solve this problem, the butterfly module having the unified architecture illustrated in FIG. 5 may be used. As illustrated in FIGS. 5A, 5B, the unified butterfly architecture of FIG. 5 can be configured as both DIT (FIG. 5A) and DIF (FIG. 59). The unified butterfly architecture comprises two sets of modular adders 40 and subtractors 50 along with multiplexing circuitry to select whether the multiplication 60 with w is performed before or after the addition and subtraction. Since the critical path of the design is inside the modular multiplier 60, there is no impact on system performance. The associated area overhead is also negligible.

The modular arithmetic blocks (i.e. adder, subtractor and multiplier circuits) inside the unified butterfly module are re-used for coefficient-wise polynomial arithmetic operations as well as for multiplying polynomials with the appropriate powers of $\psi$ and $\psi^{-1}$ during negative-wrapped convolution. Apart from butterfly and arithmetic modulo q, the crypto-processor ALU (e.g. ALU 22 in FIG. 2) also supports the following bit-wise logical operations—AND, OR, XOR, left shift and right shift.

Hardware architectures for polynomial multiplication using NTT comprise memory banks for storing the polynomials along with the ALU which performs butterfly computations.

Since each butterfly needs to read two inputs and write two outputs all in the same cycle, in conventional cryptographic processing systems, these memory banks are typically implemented using dual-port RAMs or four-port RAMs. Although true dual-port memory is easily available in state-of-the-art commercial FPGAs in the form of block RAMs (BRAMs), use of dual-port static RAMs (SRAMs) in ASIC can pose large area overheads in resource-constrained devices. Compared to a simple single-port SRAM, a dual-port SRAM has double the number of row and column decoders, write drivers and read sense amplifiers. Also, the bit-cells in a low-power dual-port SRAM consist of ten transistors (10T) compared to the usual six transistor (6T) bit-cells in a single-port SRAM. Therefore, the area of a dual-port SRAM can be as much as double the area of a single-port SRAM with the same number of bits and column muxing.

To reduce this area overhead, in accordance with one aspect of the concepts described herein, an area-efficient NTT memory architecture may be implemented which uses the constant-geometry FFT data-flow and comprises only single-port SRAMs.

The constant geometry NTT is described in Algorithm 7.

---

Algorithm 7 Constant Geometry Out-of-Place NTT [Pol71]

Require: Polynomial $a(x) \in R_q$ and n-th primitive root of unity $w_n \in \mathbb{Z}_q$
Ensure: Polynomial $\hat{a}(x) \in R_q$ such that $\hat{a}(x) = NTT(a(x))$
1: a ← PolyBitRev(a)
2: for (s = 1; s ≤ lg n; s = s + 1) do
3:  for (j = 0; j < n/2; j = j + 1) do
4:   k ← $\lfloor j/2^{lg(n-s)} \rfloor \cdot 2^{lg(n-s)}$
5:   â[j] ← a[2j] + a[2j + 1] · $w_n^k$ mod q
6:   â[j + n/2] ← a[2j] − a[2j + 1] · $w_n^k$ mod q
7:  end for
8:  if s ≠ lg n then
9:   a ← â
10:  end if
11: end for
12: return â

---

It should be noted that the coefficients of the polynomial are accessed in the same order for each stage, thus simplifying the read/write control circuitry. For constant geometry DIT NTT, the butterfly inputs are a[2j] and a[2j+1] and the outputs are â[j] and â[j+n/2], while the inputs are a[j] and â[j+n/2] and the outputs are â[2j] and â[2j+1] for DIF NTT. However, the constant geometry NTT is inherently out-of-place, therefore requiring storage for both polynomials a and â.

For one hardware implementation, two memory banks (left and right—e.g. 23a, 23b in FIG. 2) may be created to store these two polynomials while allowing the butterfly inputs and outputs to "ping-pong" between them during each stage of the transform. Although out-of-place NTT requires storage for both the input and output polynomials, this does not affect the total memory requirements of the crypto-processor because the total number of polynomials required to be stored during the protocol execution is greater than two, e.g., four polynomials are involved in any computation of the form b=a s+e.

Next, described are the construction of memory banks using single-port SRAMs so that each butterfly can be computed in a single cycle without causing read/write hazards. As shown.

Figure 6:
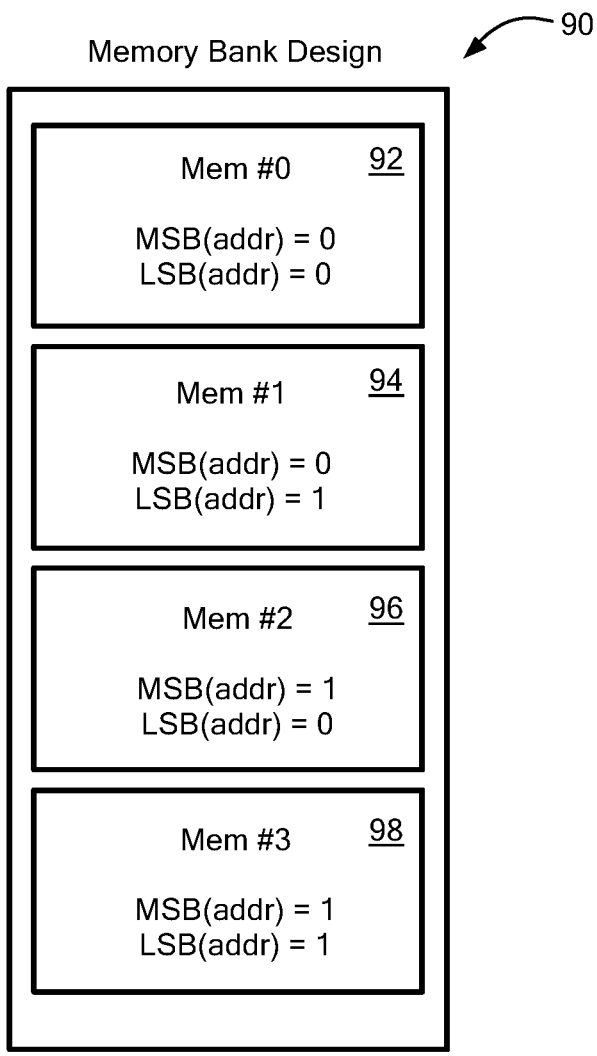
FIG. 6 is a block diagram of a memory bank construction using single-port SRAMs.

Referring now to FIG. 6, each polynomial is split among four single port SRAMs 92-98 (denoted Mem 0-3 in FIG. 6) on the basis of the least and most significant bits (LSB and MSB) of the coefficient index (or address addr). This allows simultaneously accessing coefficient index pairs of the form (2j, 2j+1) and (j, j+n/2).

Figure 6A:
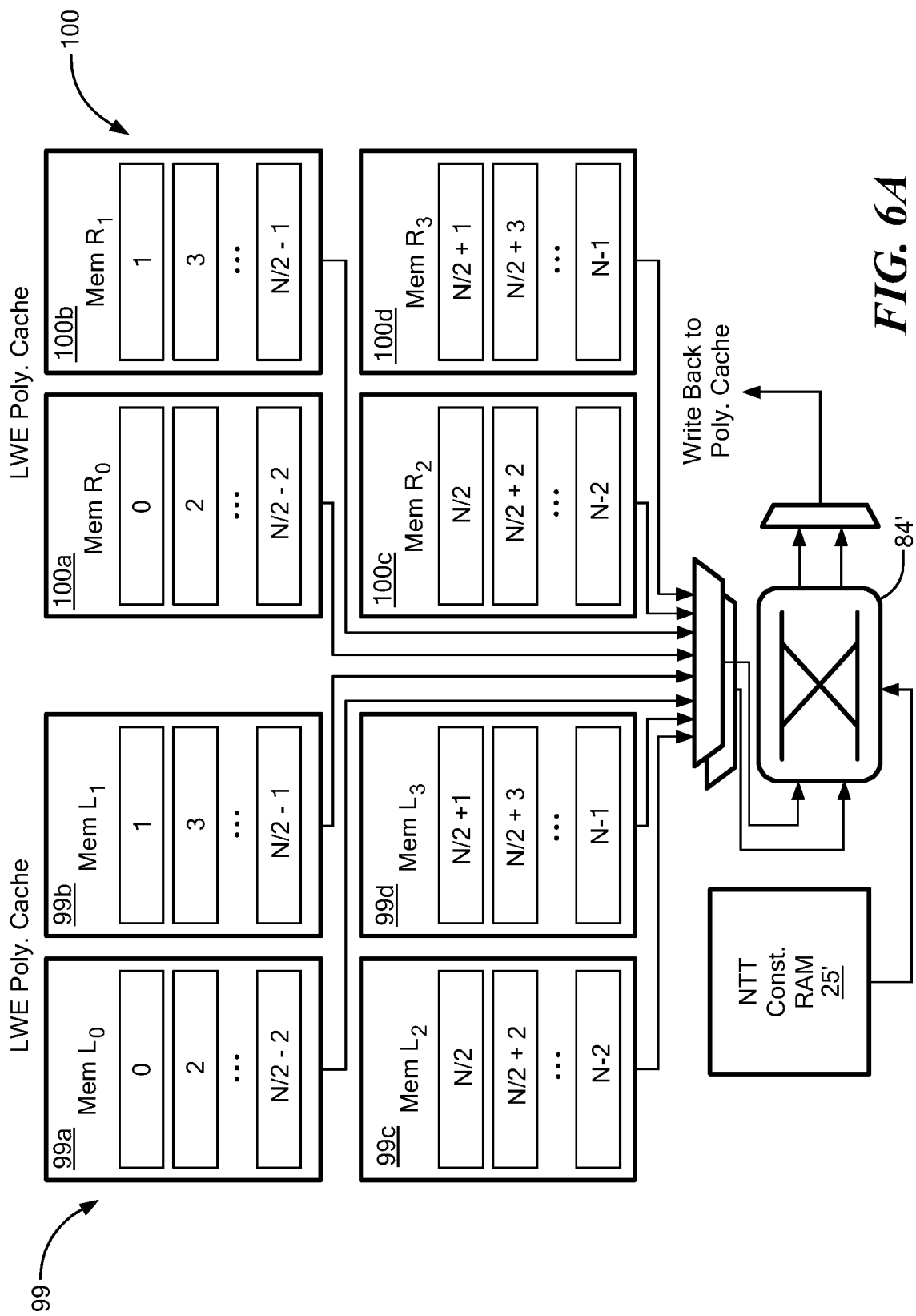
FIG. 6A is a block diagram of a memory bank construction using an area-efficient NTT architecture using two memory banks which may be the same as or similar to those shown in FIG. 6.

Referring now to FIG. 6A, an example NTT memory architecture comprises two such memory banks 99, 100 (and labelled as LWE Poly Cache in FIG. 6A). Memory banks 99, 100 may, for example, be the same as or similar to memories 23a, 23b in FIG. 2. In the example of FIG. 6A, each memory bank 99, 100 comprises four SRAMs (99a-99d and 100a-100d, respectively). In every cycle, the inputs to butterfly 84' are read from two different single-port SRAMs (out of four SRAMs in the input memory bank) and the outputs are also n] and j $\in [0, 2^{i-1})$ and $\omega i$, $^{n-1\omega-i}$ mod q for i $\in [0, n)$. Since n<2048 and q<$2^{24}$, this would require another 24 KB of memory. To reduce this overhead, we exploit the following properties of $\omega$ and $\psi$: $\omega_{n/2}=\omega_n^2$, $\omega_n^{-j}=\omega_n^{n-j}$, and $\omega=\psi^2$.

Then, it's sufficient to store only $\omega_n^j$ for j$\in$[0, n/2) and $\psi^i$, $n^{-1}\psi^{-i}$ mod q for i$\in$[0, n), thus reducing the twiddle factor memory size by 37.5% down to 15 KB.

Finally, the energy-efficiency and performance of the NTT with state-of-the-art software and ASIC hardware implementations may be compared as shown in Table 1

TABLE 1

| Design | Platform | Tech (nm) | VDD (V) | Freq (MHz) | Parameters | NTT Cycles | NTT Energy |
|---|---|---|---|---|---|---|---|
| This Work | ASIC | 40 | 1.1 | 72 | (n = 256, q = 7681) | 1,289 | 165.98 nJ |
|  |  |  |  |  | (n = 512, q = 12289) | 2,826 | 410.52 nJ |
|  |  |  |  |  | (n = 1024, q = 12289) | 6,155 | 894.28 nJ |
| Software [KRSS18] | ARM Cortex-M4 | — | 3.0 | 100 | (n = 256, q = 7681) | 22,031 | 13.55 µJ |
|  |  |  |  |  | (n = 512, q = 12289) | 34,262 | 21.07 µJ |
|  |  |  |  |  | (n = 1024, q = 12289) | 75,006 | 46.13 µJ |
| Song et al. [STCZ18] | ASIC | 40 | 0.9 | 300 | (n = 256, q = 7681) | 160 | 31 nJ |
|  |  |  |  |  | (n = 512, q = 12289) | 492 | 96 nJ |
| Nejatollahi et al. [NDBC18] | ASIC | 45 | 1.0 | 100 | (n = 512, q = 12289) | 2,854 | 1016.02 nJ |
|  |  |  |  |  |  | 11,053 | 596.86 nJ |
| Fritzmann, et al. [FS19] | ASIC | 65 | 1.2 | 25 | (n = 256, q = 7681) | 2,056 | 254.52 nJ |
|  |  |  |  |  | (n = 512, q = 12289) | 4,616 | 549.98 nJ |
|  |  |  |  |  | (n = 1024, q = 12289) | 10,248 | 1205.03 nJ |
| Roy et al. [RVM + 14] | FPGA | — | — | 313 | n = 256, q = 7681 | 1,691 | — |
|  |  |  |  | 278 | (n = 512, q = 12289) | 3,443 | — |
| Du et al. [DB16] | FPGA | — | — | 233 | (n = 256, q = 7681) | 4,066 | — |
|  |  |  |  |  | (n = 512, q = 12289) | 8,806 | — | written to two different single-port SRAMs (out of four SRAMs in the output memory bank), thus avoiding hazards.

Figure 7:
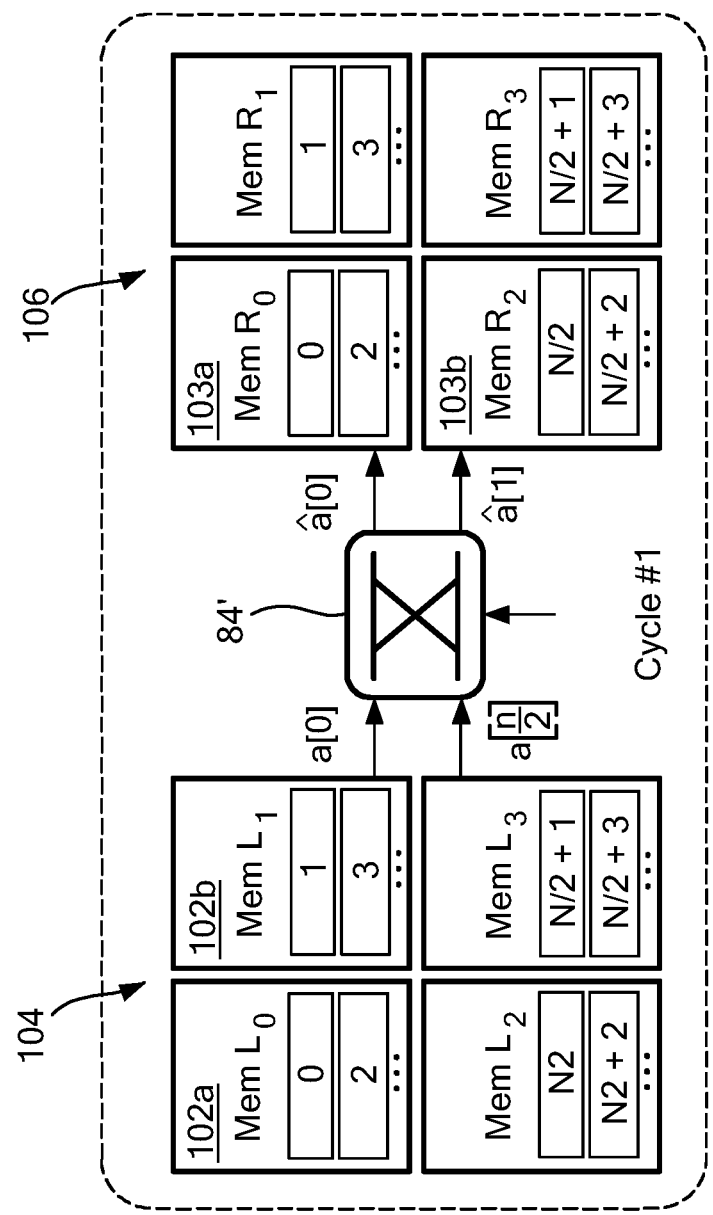
FIGS. 7 and 7A illustrate data-flow of an illustrative NTT memory architecture in accordance with the concepts describe herein in the first two cycles.
Figure 7A:
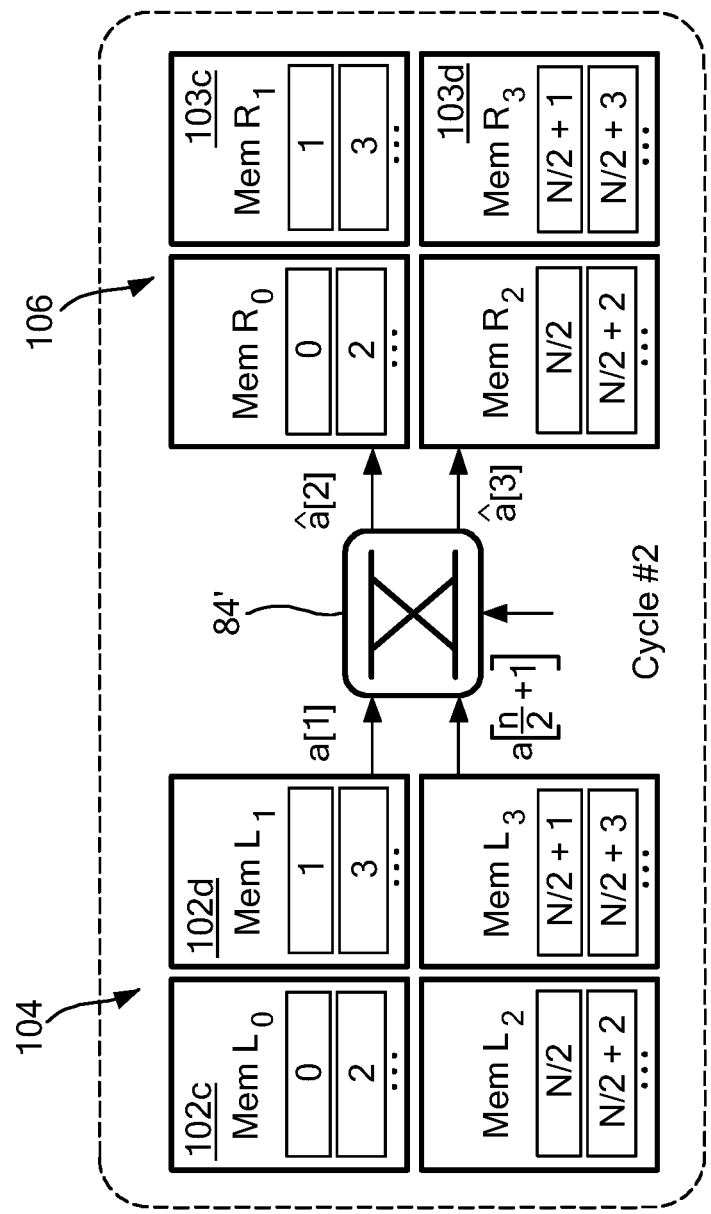

FIGS. 7 and 7A illustrate data-flow of an illustrative NTT memory architecture in accordance with the concepts describe herein in the first two cycles with butterfly inputs denoted as 102a-102d and outputs denoted as 103a-103d.

Referring now to FIGS. 7 and 7A, the data flow in the first two cycles of NTT are shown where an input polynomial a is stored in the left bank 104 and the output polynomial a is stored in the right bank 106. As the input and output polynomials exchange their memory banks from one stage to the next, the NTT control circuitry ensures that the same data-flow is maintained.

Figure 8:
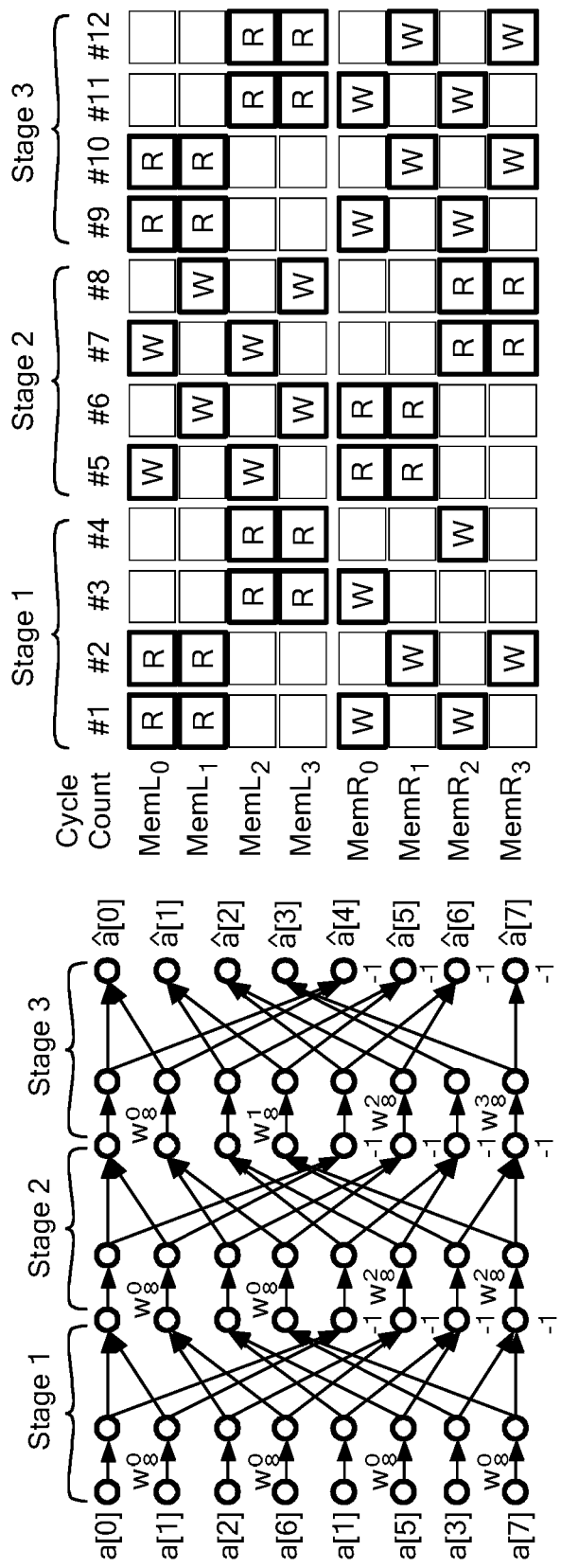
FIGS. 8 and 8A illustrate memory access patterns for 8-point DIT and DIF NTT using a single-port SRAM-based memory architecture (R and W denote read and write respectively)
Figure 8A:
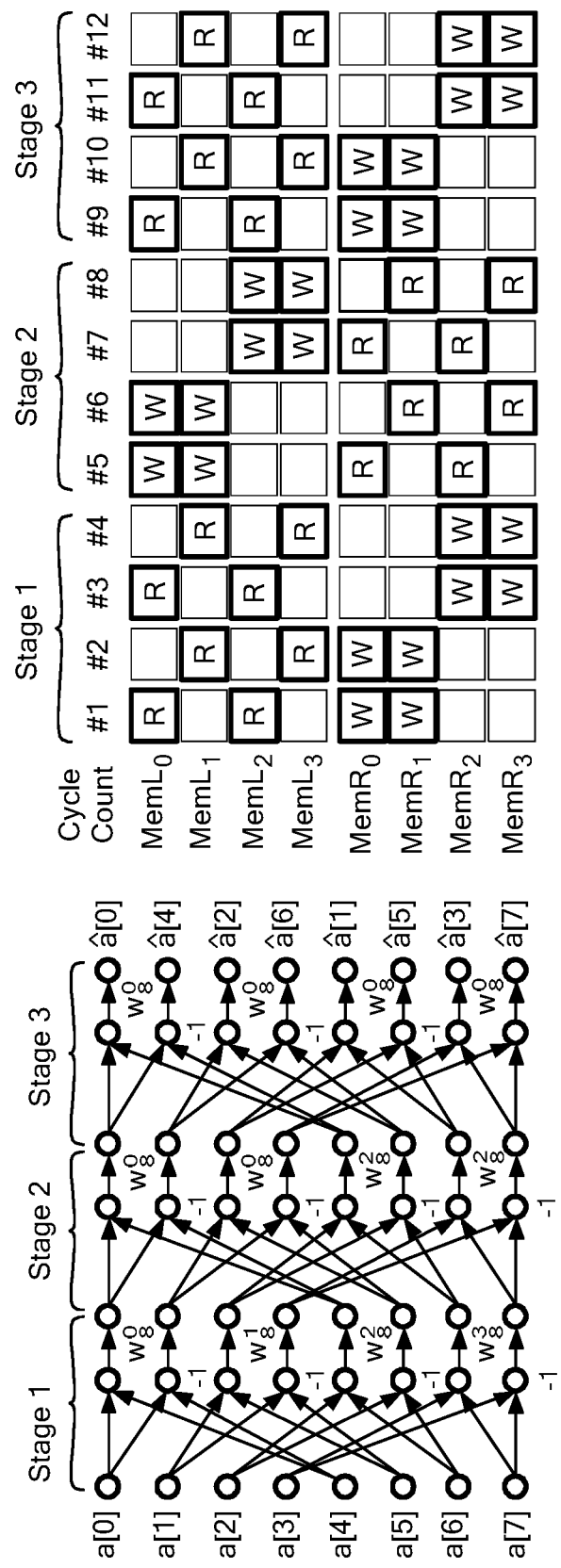

To illustrate this and referring now to FIGS. 8 and 8A, memory access patterns for all three stages of an 8-point NTT are shown for both decimation-in-time (FIG. 8) and decimation-in-frequency (FIG. 8A).

In one example embodiment, the two memory banks comprise four 1024×24-bit single-port SRAMs each (24 KB total) which together they store 8192 entries, which can be split into four 2048-dimension polynomials or eight 1024-dimension polynomials or sixteen 512-dimension polynomials or thirty-two 256-dimension polynomials or sixty-four 128-dimension polynomials or one-hundred-twenty-eight 64-dimension polynomials. By constructing this memory using single-port SRAMs (and some additional read-data multiplexing circuitry), an area savings can be achieved. In this example, an area savings equivalent to 124 k GE has been achieved compared to a dual-port SRAM-based implementation. This is particularly important since SRAMs account for a large portion of the total hardware area in ASIC implementations of lattice-based cryptography.

In order to allow configurable parameters, our NTT hardware also requires additional storage (labelled as 25' and denoted NTT Constants RAM in FIG. 6) for the pre-computed twiddle factors: $\omega j2i$, $\omega-j$ $2i$ mod q for i $\in$ [1, lg For the software implementation, assembly-optimized code for ARM Cortex-M4 from the PQM4 crypto library has been used, and measurements were performed using a NUCLEO-F411RE development board. Total cycle count of the NTT described herein is (n2+1)lg n+(n+1), including the multiplication of polynomial coefficients with powers of 'b. All measurements for the NTT implementation were performed on a crypto-processor chip having a configuration the same as or similar to that described on conjunction with FIG. 2 and operating at clock frequency of 72 MHz and nominal supply voltage 1.1 V.

It was found that the hardware-accelerated NTT described herein is up to 11× more energy-efficient than the software implementation, after accounting for voltage scaling. It is 2.5× more energy-efficient compared to some conventional NTT designs having a similar cycle count, and 1.5× more energy-efficient compared to the conventional NTT designs having a 4× cycle count.

The NTT described herein is fast since the memory architecture allows computing one butterfly per cycle even with single-port SRAMs, while having similar energy consumption. The energy-efficiency of the described NTT implementation is largely due to the design of low-power modular arithmetic components, as discussed earlier, which decreases overall modular reduction complexity and simplifies the logic circuitry. However, the described NTT is still about 4× less energy-efficient compared to some prior art processors, primarily due to the fact such prior art processors use 16 parallel butterfly units along with dedicated four-port scratch-pad buffers to achieve higher parallelism and lower energy consumption at the cost of significantly larger chip area (2.05 mm$^2$) compared to the example design described herein having a chip area of about 0.28 mm$^2$.

As will be discussed below, sampling accounts for a significant portion of the computational cost in Ring-LWE and Module-LWE schemes, therefore justifying the choice of area-efficient NTT architecture at the cost of some energy overhead.

It is recognized that hardness of the LWE problem is directly related to statistical properties of the error samples. Therefore, an accurate and efficient sampler is an important component of any lattice cryptography implementation. Sampling accounts for a major portion of the computational overhead in software implementations of ideal and module lattice-based protocols. A cryptographically secure pseudo-random number generator (CS-PRNG) is used to generate uniformly random numbers, which are then post-processed to convert them into samples from different discrete probability distributions. Described herein below is an energy-efficient CS-PRNG along with fast sampling techniques for configurable distribution parameters.

Some of the standard choices for CS-PRNG are SHA-3 in the SHAKE mode, AES in counter mode and ChaCha20 In order to identify the most efficient among these, they may be compared in terms of area, pseudo-random bit generation performance and energy consumption.

Based upon such a comparison, it was discovered that although all three primitives have comparable area-energy product, SHA-3 is 2× more energy-efficient than ChaCha20 and 3× more energy-efficient than AES; and this is largely due to the fact that SHA-3 generates the highest number of pseudo-random bits per round.

The basic building block of SHA-3 is the Keccak permutation function Therefore, in one embodiment of a crypto-processor includes a PRNG comprising a 24-cycle Keccak-f[1600] core which can be configured in different SHA-3 modes and consumes 2.33 nJ per round at nominal voltage of 1.1 V (and 0.89 nJ per round at 0.68 V). Its 1600-bit state is processed in parallel, thus avoiding expensive register shifts and multiplexing required in serial architectures.

Figure 9:
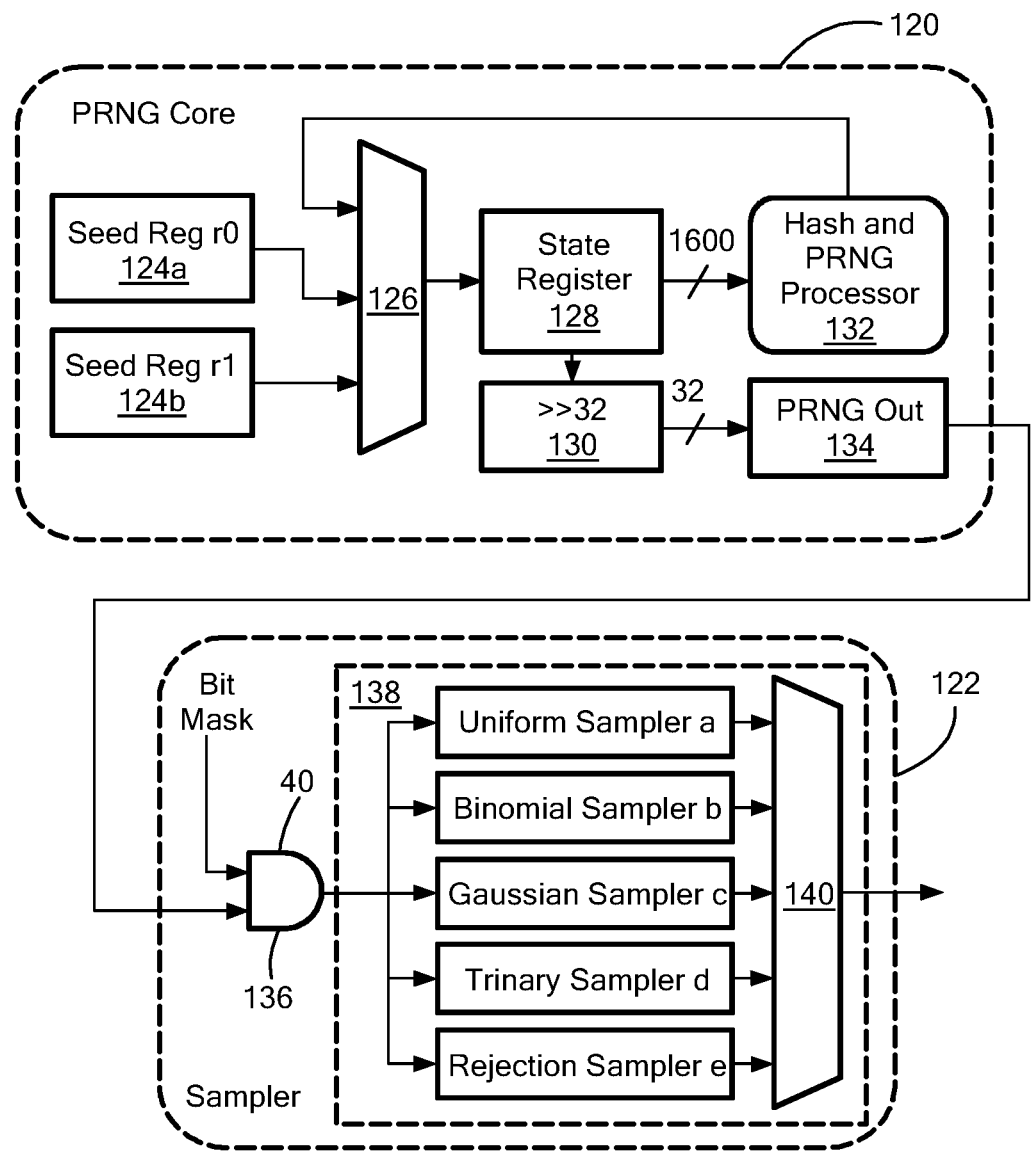
FIG. 9 is a block diagram of a sampler.

Referring now to FIG. 9, a hash and PRNG processor 120 suitable for use in an energy-efficient, configurable crypto-processor such as that described above in conjunction with at least FIG. 2 is coupled to a discrete distribution sampler 122. Hash and PRNG processor 120 and discrete distribution sampler 122 may be the same as or similar hash and PRNG processor 24 and distribution sampler 26 described above in conjunction with FIG. 2.

In one embodiment, the discrete distribution sampler is implemented with an energy-efficient SHA-3 core as noted above.

Pseudo-random bits generated by SHAKE-128 or SHAKE-256 are stored in state register 128 which may, for example, be provided as a 1600-bit Keccak state register, and shifted out a predetermined number of bits (e.g. 32 bits) at a time as required by sampler 122. Sampler 122 then feeds these bits, logically AND-ed (illustrated with logical AND date 40) with an appropriate bit mask to truncate the shifted bits to desired size, to post-processing logic to perform one of the following five types of operations: (a) rejection sampling in [0, q); (b) binomial sampling with standard deviation a-; (c) discrete Gaussian sampling with standard deviation a and desired precision up to 32 bits; (d), uniform sampling in [-ii, i] for i<q; and (e) trinary sampling in {-1, 0, +1} with specified weights for the +1 and -1 samples.

The public polynomial a in Ring-LWE and the public vector a in Module-LWE have their coefficients uniformly drawn from $Z_q$ through rejection sampling, where uniformly random numbers of desired bit size are obtained from the PRNG as candidate samples and only numbers smaller than q are accepted. The probability that a random number is not accepted is known as the rejection probability. Table 2 illustrates rejection probabilities for different primes with and without fast sampling.

TABLE 2

| Prime | Bit Size | Rej. Prob. (w/o. scaling) | Scaling Factor | Rej. Prob. (w. scaling) | Decrease in Rej. Prob. |
|---|---|---|---|---|---|
| 7681 | 13 | 0.06 | 1 | 0.06 | — |
| 12289 | 14 | 0.25 | 5 | 0.06 | 0.19 |
| 40961 | 16 | 0.37 | 3 | 0.06 | 0.31 |
| 65537 | 17 | 0.50 | 7 | 0.12 | 0.38 |
| 120833 | 17 | 0.08 | 1 | 0.08 | — |
| 133121 | 18 | 0.49 | 7 | 0.11 | 0.38 |
| 184321 | 18 | 0.30 | 11 | 0.03 | 0.27 |
| 838041 | 23 | ≈0 | 1 | ≈0 | — |
| 805888 | 23 | 0.04 | 1 | 0.04 | — |
| 420556 | 23 | 0.50 | 7 | 0.12 | 0.38 |
| 420659 | 23 | 0.50 | 7 | 0.12 | 0.38 |
| 840499 | 24 | 0.50 | 7 | 0.12 | 0.38 |

For prime q, the rejection probability is calculated as $(1-q/2^{\lceil lg\ q \rceil})$. In Table 2, listed are the rejection probabilities for primes mentioned earlier in conjunction with FIGS. 4 and 4A. It is noted that different primes have very different rejection probabilities, often as high as 50%, which can be a bottleneck in lattice-based protocols. To solve this problem, pseudo-random numbers smaller than 5q are accepted for q=12289, thus reducing the rejection probability from 25% to 6%. The approach may be extended for any prime q by scaling the rejection bound from q to kq, for appropriate small integer k, so that the rejection probability is now $(1-kq/2^{\lceil lg\ kq \rceil})$. The scaling factors for the primes are listed in Table 2 along with the corresponding decrease in rejection probability.

TABLE 3

Comparison of rejection sampling with

| software Design | Platform | Tech (nm) | VDD (V) | Freq (MHz) | Parameters | Samp. Cycles | Samp. Energy |
|---|---|---|---|---|---|---|---|
| This Work | ASIC | 40 | 1.1 | 72 | (n = 256, q = 7681) | 461 | 50.90 nJ |
| | | | | | (n = 512, q = 12289) | 921 | 105.74 nJ |
| | | | | | (n = 1024, q = 12289) | 1,843 | 211.46 nJ |
| Software [KRSS18] | ARM Cortex-M4 | — | 3.0 | 100 | (n = 256, q = 7681) | 60,433 | 37.17 μJ |
| | | | | | (n = 512, q = 12289) | 139,153 | 85.58 μJ |
| | | | | | (n = 1024, q = 12289) | 284,662 | 175.07 μJ |

Although this method reduces rejection rates, the output samples now lie in [0, kq) instead of [0, q).

In one prior art example, for q=12289 and k=5, the accepted samples are reduced to $Z_q$ by subtracting q from them up to four times.

Since k is not fixed for our rejection sampler, Barrett reduction may be employed for this purpose. Unlike modular multiplication, where the inputs lie in $[0, q^2)$, the inputs here are much smaller; so the Barrett reduction parameters are also quite small, therefore requiring little additional logic. In Table 3, performance of a rejection sampler (SHAKE-128 used as PRNG) as described herein is compared with a software implementation on ARM Cortex-M4 using assembly-optimized Keccak For binomial sampling, two k-bit chunks are taken from the PRNG and the difference of their Hamming weights is computed. The resulting samples follow a binomial distribution with standard deviation $\sigma=\sqrt{k/2}$. The value of k may be configured to any value up to 32, thus providing the flexibility to support different standard deviations.

Table 4 shows comparison of the binomial sampling performance (SHAKE-256 used as PRNG) with state-of-the-art software and hardware implementations in.

TABLE 4

| Design | Platform | Tech (nm) | VDD (V) | Freq (MHz) | Parameters | Samp. Cycles | Samp. Energy |
|---|---|---|---|---|---|---|---|
| This Work | ASIC | 40 | 1.1 | 72 | (n = 256, k = 4) | 505 | 58.20 nJ |
|  |  |  |  |  | (n = 512, k = 8) | 1,009 | 116.26 nJ |
|  |  |  |  |  | (n = 1024, k = 8) | 2,018 | 232.50 nJ |
| Software [KRSS18] | ARM Cortex-M4 | — | 3.0 | 100 | (n = 256, k = 4) | 52,603 | 32.35 μJ |
|  |  |  |  |  | (n = 512, k = 8) | 155,872 | 95.86 μJ |
|  |  |  |  |  | (n = 1024, k = 8) | 319,636 | 196.58 μJ |
| Song et al. [STCZ18] | ASIC | 40 | 0.9 | 300 | (n = 512, k = 16) | 3,704 | 1.25 μJ |
| Order et al. [OG17] | FPGA | — | — | 125 | (n = 1024, k = 16) | 33,792 | — |

As can be seen from Table 4, the sampler described herein is more than two orders of magnitude more energy-efficient compared to the software implementation on ARM Cortex-M4 which uses assembly-optimized Keccak It is also 14× more efficient than systems which uses Knuth-Yao sampling for binomial distributions with ChaCha20 as PRNG.

The discrete Gaussian sampler implements an inversion method of sampling from a discrete symmetric zero-mean distribution x on Z with small support which approximates a rounded continuous Gaussian distribution, as used for example, in Frodo and R.EMBLEM. For a distribution with support $S_x=\{-s, \ldots -1, 0, 1, \ldots, s\}$, where s is a small positive integer, the probabilities $\Pr(z)$ for $z \in S_{x1}$, such that $\Pr(z)=\Pr(-z)$ can be derived from the cumulative distribution table (CDT) $T_x=(T_x[0], T_x[1], \ldots T_x[s])$, where $2^{-r} \cdot T_x[0]=\Pr(0)/2-1$ and $2^{-r} \cdot T_x[z]=\Pr(0)/2-1+\Sigma_{i=1}^{i=z}\Pr(i)$ for $z \in [1, s]$ for a given precision r. Given random inputs $r0 \in \{0, 1\}$, $r1 \in [0, 2^r)$ and the distribution table $T_x$, a sample $e \in Z$ from x can be obtained using Algorithm 8.

---

Algorithm 8 Discrete Gaussian Sampling using Inversion Method [NAB+ 19]

---

Require: Random inputs $r_0 \in \{0, 1\}$, $r_1 \in [0, 2r)$ and table $T_X = (T_X[0], \ldots, T_X[s])$
Ensure: Sample $e \in \mathbb{Z}$ from X
  1: $e \leftarrow 0$
  2: for ($z = 0$; $z < s$; $z = z + 1$) do
  3:    if $r_1 > T_X[z]$ then
  4:        $e \leftarrow e + 1$
  5:    end if
  6: end for
  7: $e \leftarrow (-1)^{r_0} \cdot e$
  8: return e The sampling must be constant-time in order to eliminate timing side-channels, therefore the algorithm does a complete loop through the entire table $T_x$. The comparison $r_1 > T_x[z]$ must also be implemented in a constant-time manner. One implementation adheres to these requirements and uses a 64×32 RAM to store the CDT, allowing the parameters s≤64 and r≤32 to be configured according to the choice of the distribution.

Table 6, illustrates a comparison between Gaussian sampler performance (SHAKE-256 used as PRNG) using the techniques described herein with software implementation on ARM Cortex-M4 using assembly-optimized Keccak.

TABLE 5

| Design | Platform | Tech (nm) | VDD (V) | Freq (MHz) | Parameters | Samp. (Cycles) | Samp. (Energy) |
|---|---|---|---|---|---|---|---|
| This Work | ASIC | 40 | 1.1 | 72 | (n = 512, σ = 25.0, s = 54) | 29,169 | 1232.71 nJ |
|  |  |  |  |  | (n = 1024, σ = 2.75, s = 11) | 15,330 | 647.86 nJ |
|  |  |  |  |  | (n = 1024, σ = 2.30, s = 10) | 14,306 | 604.58 nJ |
| Software [KRSS18] | ARM Cortex-M4 | — | 3.0 | 100 | (n = 512, σ = 25.0, s = 54) | 397,921 | 244.72 μJ |
|  |  |  |  |  | (n = 1024, σ = 2.75, s = 11) | 325,735 | 200.33 μJ |
|  |  |  |  |  | (n = 1024, σ = 2.30, s = 10) | 317,541 | 195.29 μJ |

Observation of Table 5 reveals up to a 40× improvement in energy-efficiency after accounting for voltage scaling. Hardware architectures for Knuth-Yao sampling have been proposed, but they are for discrete Gaussian distributions with larger standard deviation and higher precision, not supported by the system described herein.

Several other lattice-based protocols, such as CRYSTALS-Dilithium and qTESLA, require polynomials to be sampled with coefficients uniformly distributed in the range $[-\eta, \eta]$ for a specified bound $\eta < q$. For this, again rejection sampling may be used.

Unlike rejection sampling from $Z_q$, no special techniques are required since $\eta$ is typically small or an integer close to a power of two.

A trinary sampler for polynomials with coefficients from $\{-1, 0, +1\}$ was also implemented using a sampler such as that described in conjunction with FIG. 9 Theses polynomials may be classified into three categories: (1) with m nonzero coefficients, (2) with $m_0$ +1's and $m_1$ −1's, and (3) with coefficients distributed as Pr(x=1)=Pr(x=−1)=p/2 and Pr(x=0)=1−p for p∈{½, ¼, ⅛, . . . , ¹⁄₁₂₈}. Their implementations are described in Algorithms 9, 10 and 11.

---

Algorithm 9 Trinary Sampling with m non-zero coefficients (+1's and −1's)

Require: m < n and a PRNG
Ensure: $s = (s_0, s_1, \ldots, s_{n-1})$
1: $s \leftarrow (0, 0, \ldots, 0)$ ; $i \leftarrow 0$
2: while $i < m$ do
3: $\quad$ pos $\in_R [0, n)$
4: $\quad$ sign $\in_R \{0, 1\}$
5: $\quad$ If $s_{pos} = 0$ then
6: $\quad\quad$ if sign = 0 then
7: $\quad\quad\quad s_{pos} \leftarrow 1$
8: $\quad\quad$ else
9: $\quad\quad\quad s_{pos} \leftarrow -1$
10: $\quad\quad$ end if
11: $\quad\quad i \leftarrow i + 1$
12: $\quad$ end if
13: end while
14: return s

---

Algorithm 10 Trinary Sampling with $m_0$ +1's and $m_1$ −1's

Require: $m_0 + m_1 < n$ and a PRNG
Ensure: $s = (s_0, s_1, \ldots, s_{n-1})$
1: $s \leftarrow (0, 0, \ldots, 0)$ ; $i \leftarrow 0$
2: while $i < m_0$ do
3: $\quad$ pos $\in_R [0, n)$
4: $\quad$ if $s_{pos} = 0$ then
5: $\quad\quad s_{pos} \leftarrow +1$ ; $i \leftarrow i + 1$
6: $\quad$ end if
7: end while
8: while $i < m_0 + m_1$ do
9: $\quad$ pos $\in_R [0, n)$
10: $\quad$ if $s_{pos} = 0$ then
11: $\quad\quad s_{pos} \leftarrow -1$ ; $i \leftarrow i + 1$
12: $\quad$ end if
13: end while
14: return s

---

Algorithm 11 Trinary Sampling with coefficients from $\{-1, 0, +1\}$ distributed according to Pr(x = 1) = Pr(x = −1) = ρ/2 and Pr(x = 0) = 1 − ρ

Require: $k \in [1, 7]$, $\rho = 1/2^k$ and a PRNG
Ensure: $s = (s_0, s_1, \ldots, s_{n-1})$
1: for (i = 0; i < n; i = i + 1) do
2: $\quad x \in_R [0, 2^k)$
3: $\quad$ if x = 0 then
4: $\quad\quad s_i \leftarrow 1$
5: $\quad$ else if x = 1 then
6: $\quad\quad s_i \leftarrow -1$
7: $\quad$ else
8: $\quad\quad s_i \leftarrow 0$
9: $\quad$ end if
10: end for
11: return s

---

For the first two cases, processing begins with a zero-polynomial s of size n. Then, uniformly random coefficient indices ∈[0, n) are generated, and the corresponding coefficients are replaced with −1 or +1 if they are zero. For the third case, sampling of the coefficients is based on the observation that for a uniformly random number $x \in [0, 2^k)$, $\Pr(x=0) = 1/2^k$, $\Pr(x=1) = 1/2^k$ and $\Pr(x \in [2, 2^k)) = 1 - 1/2^k$. Therefore, for the appropriate value of $k \in [1, 7]$, one can generate samples from the desired trinary distribution with $p=1/2^k$. For all three algorithms, the symbol $\epsilon_R$ denotes pseudo-random number generation using the PRNG.

It should be understood that various embodiments of the concepts disclosed herein are described with reference to the related drawings. Alternative embodiments can be devised without departing from the scope of the broad concepts described herein. It is noted that various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to disposing a layer or element "A" over a layer or element "B" include situations in which one or more intermediate layers or elements (e.g., layer or element "C") is between layer/element "A" and layer/element "B" as long as the relevant characteristics and functionalities of layer/element "A" and layer/element "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance, or illustration." Any embodiment or design described herein as "exemplary" is not necessarily to be construed as preferred or advantageous over other embodiments or designs. The terms "one or more" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

References in the specification to "one embodiment," "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description provided herein, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first structure, such as a first structure, is present on a second element, such as a second structure, where intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

One skilled in the art will realize the concepts, structures, devices, and techniques described herein may be embodied in other specific forms without departing from the spirit or essential concepts or characteristics thereof. The foregoing embodiments are therefore to be considered in all respects illustrative rather than limiting of the broad concepts sought to be protected. The scope of the concepts is thus indicated by the appended claims, rather than by the foregoing description, and all changes that come within the meaning and range of equivalency of the claims are therefore intended to be embraced therein.

What is claimed is:

1. A lattice cryptography processor comprising:
    an instruction memory configured to have stored therein one or more of configurable parameters and/or custom instructions for polynomial sampling and/or arithmetic operations for controlling the operation of the lattice cryptography processor;
    one or more cache memories;
    a configurable modular arithmetic unit (MAU) coupled to the one or more cache memories, the configurable modular arithmetic unit to perform polynomial operations;
    a core, coupled to the one or more cache memories, the core for hashing and pseudo-random number generation (PRNG); and
    a discrete distribution sampler coupled to the core and configured to sample a polynomial sequence provided by the MAU, the discrete distribution sampler configured for operation in a plurality of different sampling modes and coupled to receive information from the instruction memory and wherein, in response to instructions provided by the instruction memory, the discrete distribution sampler operates in a selected one of the plurality of different sampling modes.

2. The lattice cryptography processor of claim 1 wherein the discrete distribution sampler can operate in any of: a uniform sampling mode; a binomial sampling mode; a Gaussian sampling mode; a trinary sampling mode; and a rejection sampling mode.

3. The lattice cryptography processor of claim 1 wherein the configurable modular arithmetic unit comprises a butterfly configured to operate in either of a decimation-in-frequency (DIF) mode or a decimation-in-time (DIT) mode.

4. The lattice cryptography processor of claim 1 wherein the one or more cache memories comprise one or more single port random access memories (RAMs).

5. The lattice cryptography processor of claim 1 wherein the configurable modular arithmetic unit, the cache, the core and the discrete distribution sampler are configured to operate in accordance with Ring-LWE and Module-LWE algorithms.

6. The lattice cryptography processor of claim 1 wherein the instruction memory is configured to be programmed with custom instructions to implement a plurality of lattice-based algorithms.

7. The lattice cryptography processor of claim 1 wherein the discrete distribution sampler samples polynomials via one of a: uniform sampling; or a discrete distribution sampling.

8. The lattice cryptography processor of claim 7 wherein the polynomials are generated, or sampled, either uniformly through rejection sampling or from a discrete binomial distribution.

9. The lattice cryptography processor of claim 1 wherein the configurable modular arithmetic unit is configured to perform polynomial operations including a number theoretic transform (NTT).

10. The lattice cryptography processor of claim 9 wherein computing a convolution of two polynomials comprises transforming the polynomials to the NTT domain followed by coefficient-wise multiplication and an inverse transform.

11. The lattice cryptography processor of claim 1 wherein the cache is provided as an LWE cache.

12. A quantum-secure internet of things (IoT) device comprising:
   a configurable modular lattice cryptography processor comprising:
   an instruction memory configured to have stored therein one or more of configurable parameters and/or custom instructions for polynomial sampling and/or arithmetic operations for controlling the operation of the configurable modular lattice cryptography processor;
   a cache;
   a modular arithmetic unit (MAU) coupled to the cache, the modular arithmetic unit to perform polynomial operations including a number theoretic transform (NTT);
   a core, coupled to the cache, the core for hashing and pseudo-random number generation (PRNG);
   a discrete distribution sampler coupled to the core wherein the cache, the core and the discrete distribution sampler have dedicated clock gates which can be independently configured for fine-grained power savings, and wherein the discrete distribution sampler is further configured to sample a polynomial sequence provided by the MAU, the discrete distribution sampler configured for operation in a plurality of different sampling modes and coupled to receive information from the instruction memory and wherein, in response to instructions provided by the instruction memory, the discrete distribution sampler operates in a selected one of the plurality of different sampling modes.

13. The IoT device of claim 12 wherein the lattice cryptography processor is provided as an integrated circuit.

14. The IoT device of claim 12 wherein the lattice cryptography integrated circuit comprises hardware-accelerated quantum-resistant lattice-based cryptographic protocols that can be used to secure the IoT device.

15. The IoT device of claim 12 wherein the discrete distribution sampler is configured to operate in any of: a uniform sampling mode, a binomial sampling mode, a Gaussian sampling mode, a trinary sampling mode and a rejection sampling mode.

16. The IoT device of claim 12 wherein the configurable modular arithmetic unit is provided in a butterfly configuration and may be configured to operate in either of: a DIF mode; or a DIT mode.

17. The IoT device of claim 12 wherein the lattice cryptography processor comprises one or more single port random access memories (RAMs).

18. A discrete distribution sampler comprising:
   a pseudo-random number generator (PRNG) core;
   means, coupled to an output of the PRNG core, for applying a bit mask to an output signal provided at the output of the PRNG core; and
   a sampler circuit coupled to receive an output of the means for applying a bit mask and to provide a sampled output signal at a sampler circuit output, wherein the sampler circuit is configured for operation in a plurality of different sampling modes and is configured to receive information from an instruction memory and wherein, in response to instructions provided by the instruction memory, the discrete distribution sampler operates in a selected one of the plurality of different sampling modes; and
   a combiner configured to receive and combine sampled output signals from the sampler circuit output and to provide a combiner output signal.

19. The discrete distribution sampler of claim 18 wherein the sampler circuit is configured to operate as any of:
   a rejection sampler;
   a binomial sampler;
   a uniform sampler;
   a Gaussian sampler; and
   a trinary sampler.

* * * * *